United States Patent [19]

Utsumi et al.

[11] Patent Number: 5,363,268
[45] Date of Patent: Nov. 8, 1994

[54] TAPE CASSETTE

[75] Inventors: Mitsuo Utsumi, Yawata; Osamu Zaitsu, Neyagawa; Makoto Okuda, Hirakata; Jiro Kajino, Neyagawa, all of Japan

[73] Assignee: Matsushita Electric Industrial Co., Ltd., Osaka, Japan

[21] Appl. No.: 794,121

[22] Filed: Nov. 15, 1991

[30] Foreign Application Priority Data

Nov. 16, 1990 [JP] Japan .................. 2-311726
Nov. 16, 1990 [JP] Japan .................. 2-311728
Nov. 29, 1990 [JP] Japan .................. 2-333887
Jul. 26, 1991 [JP] Japan .................. 3-187274

[51] Int. Cl.$^5$ .................................. G11B 23/087
[52] U.S. Cl. ............................ 242/347.1; 360/132
[58] Field of Search ............... 360/132; 242/197, 198, 242/199

[56] References Cited

U.S. PATENT DOCUMENTS

| | | |
|---|---|---|
| 4,235,395 | 11/1990 | Wardenaar et al. |
| 4,254,922 | 3/1981 | Wolf et al. ............... 360/132 |
| 4,625,253 | 11/1986 | Kawakami et al. |
| 4,916,565 | 4/1990 | Breuer et al. ............ 360/132 |

FOREIGN PATENT DOCUMENTS

| | | |
|---|---|---|
| 0059946 | 9/1982 | European Pat. Off. |
| 0150987 | 8/1985 | European Pat. Off. ..... 242/197 |
| 0160622 | 11/1985 | European Pat. Off. |
| 0162487 | 11/1985 | European Pat. Off. |
| 53-4094 | 2/1978 | Japan |
| 62-256286 | 11/1987 | Japan |
| 1-320693 | 12/1989 | Japan |

OTHER PUBLICATIONS

H. Miyamoto et al. Jap. Ut. Model Pat. Pub. WO 53-4094, Patented on Feb. 1, 1978 part. Eng. translation.

Primary Examiner—Stuart S. Levy
Assistant Examiner—Paul J. Ditmyer
Attorney, Agent, or Firm—Ratner & Prestia

[57] ABSTRACT

A tape cassette which includes a housing having an opening at the front portion of the housing in which opening loading posts are maneuvered, a pair of tape reels rotatably disposed in the housing, a slider slidably mounted by the housing and having a front portion located in the opening, and a front cover supported by both the slider and housing for covering the magnetic tape exposed to the outside, and shifting means for rotating the front cover in the direction in which the loading posts are entered into the opening, end sliding the front cover in such a direction that the front cover moves away from the magnetic tape so that in accordance with the movement of the slider in a direction that the front portion moves away from the magnetic tape, the magnetic tape is exposed to the outside.

16 Claims, 26 Drawing Sheets

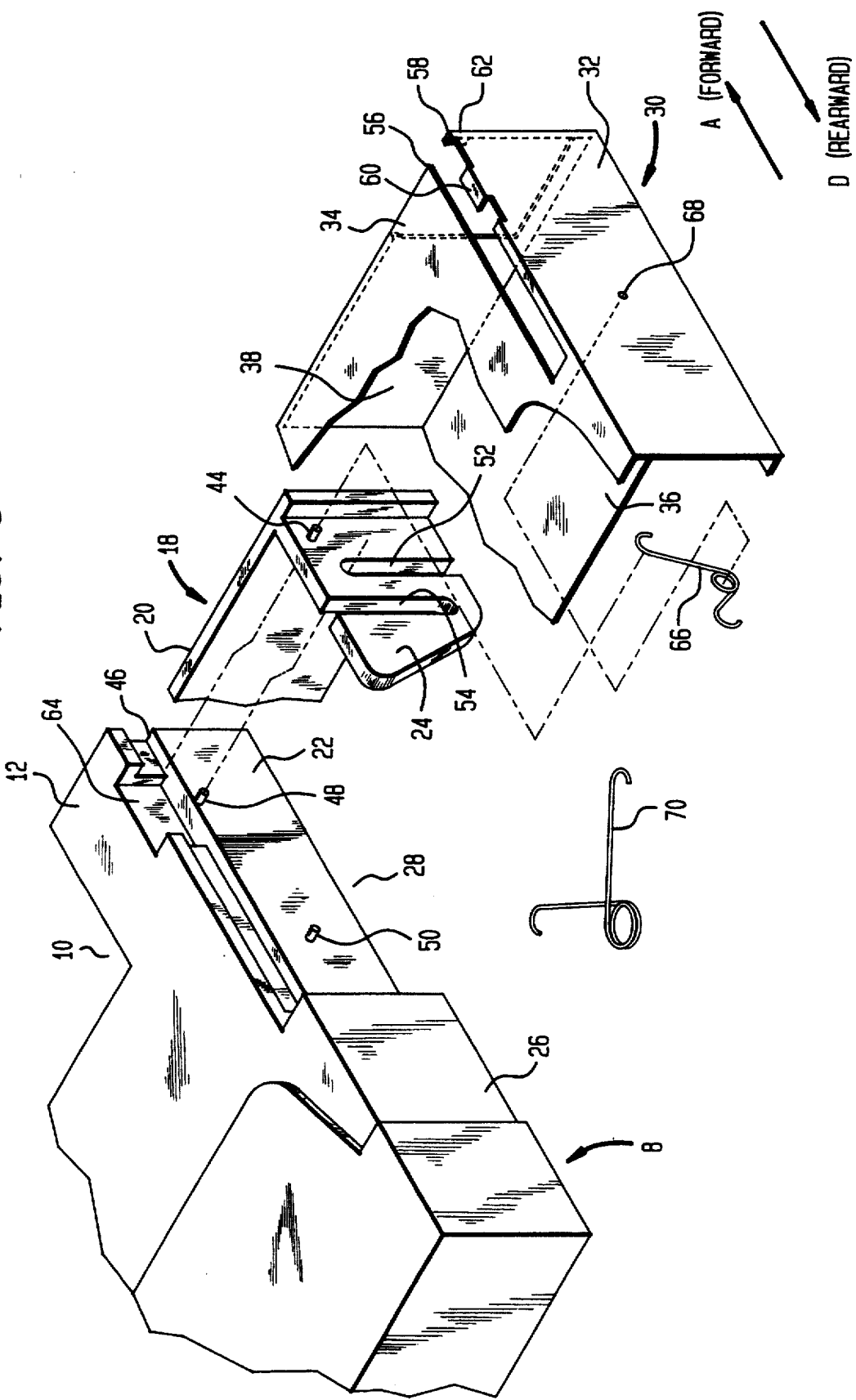

A (FORWARD) →

← D (REARWARD)

← D (REARWARD)

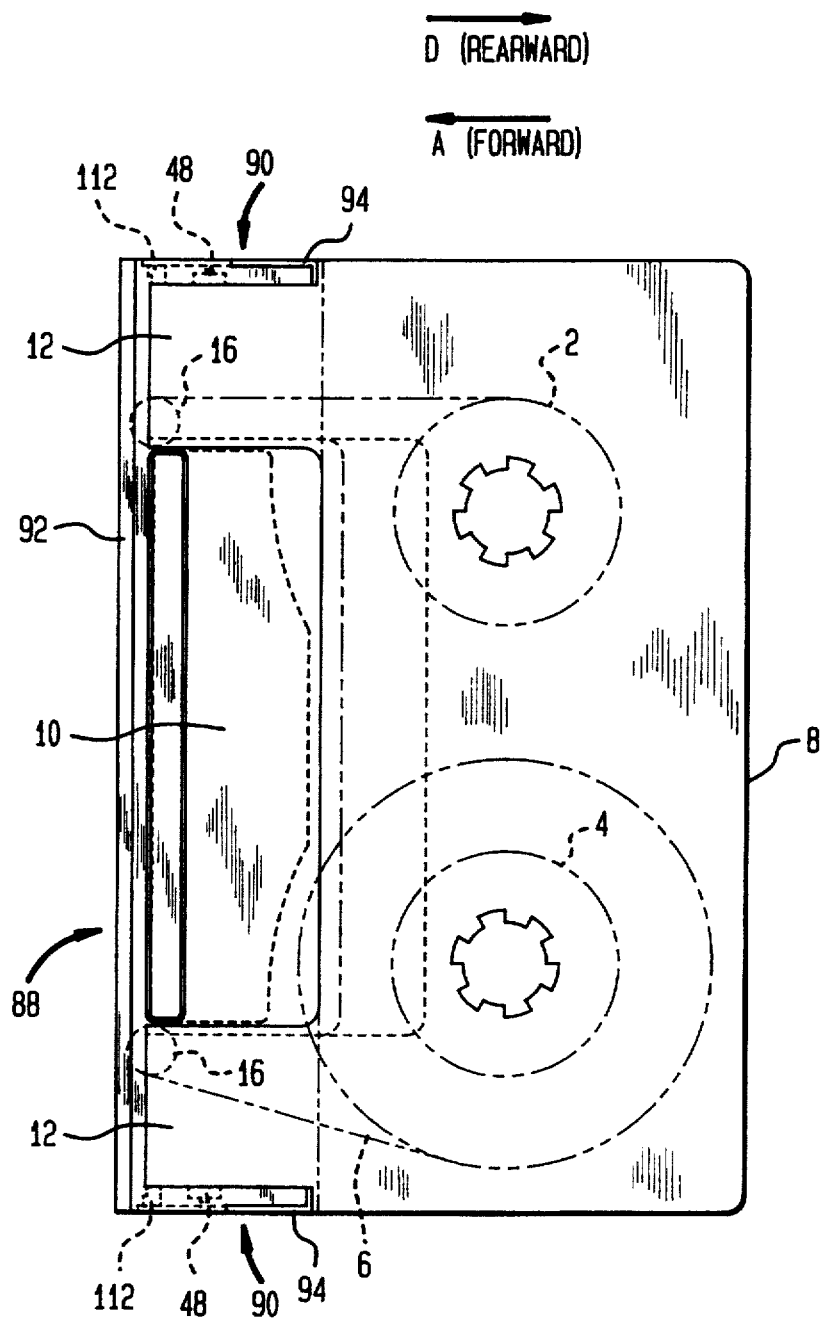

A (FORWARD)
D (REARWARD)

D (REARWARD)

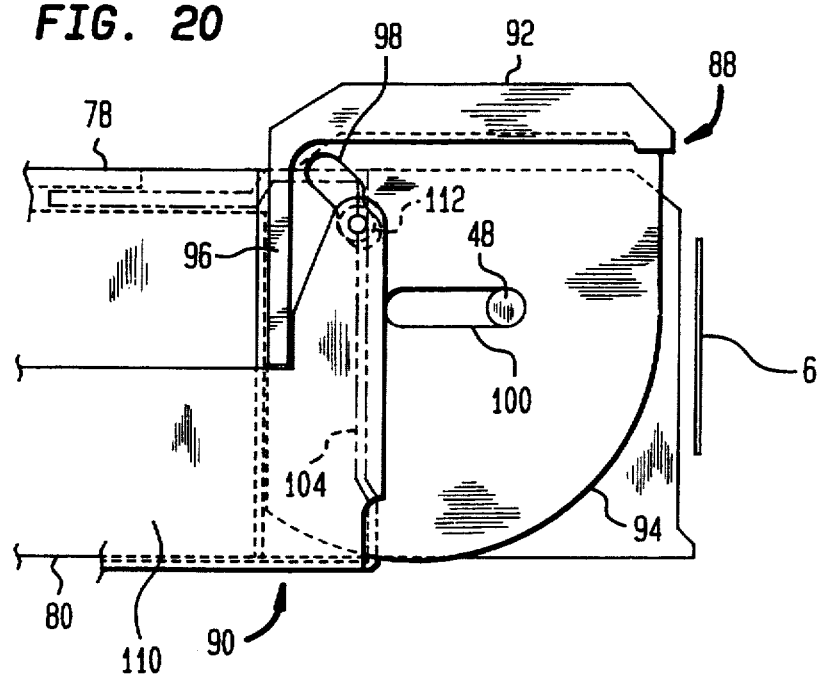
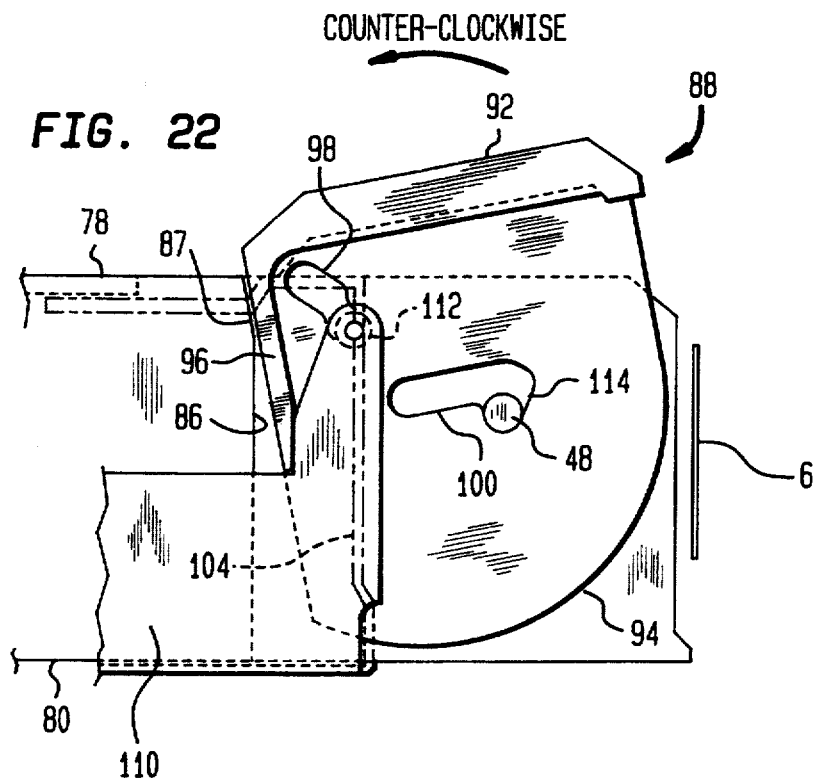

D (REARWARD)

A (FORWARD)

D (REARWARD)
A (FORWARD)

TAPE CASSETTE

BACKGROUND OF THE INVENTION

1. Field of the Invention

The present invention relates to a tape cassette used for magnetic recording/reproducing apparatus such as video cassette recorders. Hereinafter, a tape cassette will be referred to as the "cassette", a magnetic tape as the "tape", and a magnetic recording/reproducing apparatus as the "apparatus".

2. Description of the Prior Art

As a first example of a known cassette, an 8 mm cassette disclosed in Japanese Laid-Open Patent Publication No. 1-320693 will be illustrated:

Referring to FIGS. 32 to 35, the illustrated 8 mm cassette, used for a video tape recorder, includes a housing 202 in which a first reel 204 and a second reel 206 are disposed. A tape 208 is carried on the first reel 204 and the second reel 206 so as to run from the former to the latter through an opening 210 formed at the front of the housing 202. A plurality of loading posts of the apparatus are maneuvered in the opening 210 so as to bring the tape into engagement with the rotary head cylinder.

In FIG. 34, the housing 202 is provided with a rotary front cover 212 which completely covers the tape 208. When the front cover 212 is rotated upwardly (in a clockwise direction in FIG. 34) around a pair of fixed pins 220, a rear cover 214 is urged and guided by and along a guide groove 228 so as to take an upward position as shown in FIG. 35. As a result, the tape 208 is exposed to the outside. The tape 208 is stretched by the loading posts (not shown) entered into the opening 210.

Under the construction described above, when the rotary front cover 212 and the rear cover 214 are opened, they take upward positions in an overlapping state as shown in FIG. 35. To accommodate the overlapping covers 212 and 214, the housing 202 must have sufficient space in the front area. The size of the space becomes unavoidably large as compared with the thickness of the housing 202 so as to allow the rotary movement of the front and rear covers 212 and 214 therein. For example, when the two covers 212 and 214 take upward positions as shown in FIG. 35, the housing 202 becomes 1.5 times as high as when they are not opened as shown in FIG. 34.

When the two covers 212 and 214 are opened, the opening 210 is covered by the rear cover 214 in the upper portion. This limits the space for accommodating the loading posts. As a result, a relatively small, low loading posts must be used. Such dimensional restriction limits the freedom of designing a tape running mechanism which inherently occupies a sufficient space for accommodating the rotary head cylinder or cylindrical head to be operated so as to enable the tape 208 to run.

There is another type of cassette which is disclosed An Japanese Patent Publication (allowed) No. 62-50910. This cassette is used for a digital audio-tape recorder, commonly called "DAT cassette", which will be described by reference to FIGS. 36 to 38:

FIG. 36 is a perspective view showing the DAT cassette turned upside down. This cassette includes a front cover 232 covering both the front part and the upper part of an opening (not shown) formed in a housing 230. The front cover 232 is rotated around a pair of fixed pins (not shown) upwardly and downwardly with respect to the housing 230. The housing 230 is provided with a slider 234 in a lower part thereof which is slidable toward and away from the front cover 232. The slider 234 covers the back surface and the side surfaces of the housing 230, and is normally loaded toward the front cover 232 by a spring. When the slider 234 is located at a position adjacent to the front cover 232, it closes the lower open portion of the opening of the housing 230 and apertures 236 produced coaxially with a first reel and a second reel. The slider 234 is provided with apertures 238 which correspond to the apertures 236 when the slider 234 is withdrawn from the front cover 232. The front cover 232 is upwardly rotated by an upward force exerting thereon when the slider 234 is withdrawn or slid away from the opening of the housing 230.

In this DAT cassette, when the front cover 232 is rotated upwardly, the front surface of the front cover 232 is projected above the top surface of the housing 230 up to the height of 1.3 times the thickness of the housing 230. The increased height is quite against the objectives of thinness and compactness achieved by this invention.

The DAT cassette is advantageous over the above-mentioned 8 mm cassette in that the cassette is protected against dust because of the complete coverage of the opening of the housing. As a whole, however, the DAT cassette has disadvantages (1) that the apparatus becomes relatively high for the reason mentioned above, and (2) that the apparatus becomes complicated because of its mechanism required to enable the slider 234 and the front cover 232 to operate independently.

Japanese Patent Publication No. 58-21350 discloses a further known cassette, which is shown in FIGS. 39 to 41. In FIG. 39, a tape 244 pulled out of a housing 242 is covered by a front cover 246. The front cover 246 is moved along guide slots 250 produced in opposite side walls of the housing 242, and is rotated upwardly or downwardly with respect to the housing 242. A slider 248 is mounted on the housing 242 so as to be slidable to and from housing 242. In accordance with the rearward movement of the slider 248 (i.e. movement toward the back surface of the housing 242), the front cover 245 is released from the slider 248, and caused to rotate downwardly by gravity. FIGS. 40 and 41 show the state where the cassette is placed in the apparatus. As shown in FIG. 40, when the cassette is mounted on a cassette holder 252, the slider 248 is automatically moved rearwardly. Once the cassette is placed on the cassette holder 252, the cassette holder 252 is rotated downwardly around a pivot 254 as shown in FIG. 41. In accordance with the rotation of the cassette holder 252 a cover opener 256 comes into engagement with the front cover 246, and as the rotation of the cassette holder 252 advances, the front cover 246 is rotated upwardly against gravity, thereby uncovering the tape 244.

Firstly, disadvantages in common with the above-mentioned three types of cassettes are that when the front cover is rotated so as to uncover the tape, the front cover is unavoidably raised above the housing, thereby increasing the height of the housing. In the case of an 8 mm cassette, the height of the housing becomes considerably increased as is evident from FIG. 35. This results from the structure in which the front cover 212 and the rear cover 214 are rotated around a pair of fixed pivots 220. In the case of the DAT cassette, as shown in FIG.

38, when the front cover 232 is upwardly rotated around fixed pins, it projects above the top surface of the housing. This also results from the structure in which the front cover 232 is rotated around fixed pivots. This necessitates the provision of a space above the housing. The same problem arises in the examples shown in FIGS. 39 to 41.

The increased height of the housing leads to the increased size of the apparatus. This is against the latest trend toward the achievement of a thin-type compact apparatus.

Secondly, each cassette mentioned above cannot afford to have a sufficient space for allowing the loading posts and other auxiliary members to maneuver. This limits the freedom of design of the apparatus, and also makes it difficult to achieve a thin-type compact apparatus.

Thirdly, each cassette has a complicated rotary mechanism of the front cover so as to protect the tape against dust end dirt. In the 8 mm cassette, it is necessary to keep the tape out of contact with the front cover and other auxiliary members. In the DAT cassette, the apparatus must be equipped with any device whereby the front cover is upwardly moved after the rearward movement of the slider. The cassette shown in FIGS. 39 to 41 must additionally have any device for enabling the slider to slide. These additional devices make the apparatus complicated.

SUMMARY OF THE INVENTION

The tape cassette of this invention, which overcomes the above-discussed and numerous other disadvantages and deficiencies of the prior art, comprises a housing having a pair of projections at both side portions on a front surface thereof, the pair of projections forming an opening therebetween in which a plurality of loading posts are entered, and having tape running apertures; a pair of tape reels rotatably disposed in the housing; a magnetic tape disposed in the housing and carried on the tape reels and stretched through the tape running apertures of the projections by the loading posts in such a manner that the tape is exposed to the outside; a slider slidably mounted on the housing, the slider having a front portion located at the opening; a front cover supported by both the slider and the housing, the front cover and the front portion of the slider covering the magnetic tape exposed to the outside; and shifting means for rotating the front cover in the direction in which the loading posts are entered into the opening, and sliding the front cover in such a direction that the front cover moves away from the magnetic tape so that in accordance with the movement of the slider in a direction that the front portion moves away from the magnetic tape, the magnetic tape is exposed to the outside.

In a preferred embodiment, the tape cassette further comprises a sliding means for sliding the front cover from a position at which the front cover is shifted by the shifting means in such a direction that the front cover moves away from the magnetic tape located at the opening.

In a preferred embodiment, the front cover is rotatable in the direction in which the loading posts are entered in the opening after the front cover is shifted by the shifting means.

In a preferred embodiment, the magnetic tape in the opening is closed at both sides by the front cover and the slider.

In a preferred embodiment, the tape cassette further comprises means for loading the slider in the direction in which the slider is moved toward the front cover.

Alternatively, the tape cassette comprises a housing having a pair of projections at both side portions on a front surface thereof, the pair of projections forming an opening therebetween in which a plurality of loading posts are entered, and having tape running apertures; a pair of tape reels rotatably disposed in the housing; a magnetic tape disposed in the housing and carried on the tape reels and stretched through the tape running apertures of the projections by the loading posts in such a manner that the tape is exposed to the outside: a slider slidably mounted on the housing; a front cover supported by both the slider and the housing, the front cover covering the magnetic tape facing outward at the opening; rotation means for rotating the front cover in the direction in which the loading posts are entered into the opening so that in accordance with the movement of the slider away from the magnetic tape, the magnetic tape is exposed to the outside; end sliding means for sliding the front cover in such a direction that the front cover moves away from the opening from a position that the front cover is rotated by the rotation means so that the front cover is positioned toward rotation in the direction in which the loading posts are entered into the opening.

In a preferred embodiment, the front cover is rotated in the direction in which the loading posts are entered.

Alternatively, the tape cassette comprises a housing having a pair of projections at both side portions on a front surface thereof, the pair of projections forming an opening therebetween in which a plurality of loading posts are entered, and having tape running apertures; a pair of tape reels rotatably disposed in the housing; a magnetic tape disposed in the housing and carried on the tape reels and stretched through the tape running apertures of the projections by the loading posts in such a manner that the tape is exposed to the outside; a slider slidably mounted on the housing; a front cover supported by both the slider and the housing, and covering the magnetic tape facing outward at the opening; rotation means for rotating the front cover in the direction in which the loading posts are entered into the opening so that in accordance with the movement of the slider away from the magnetic tape, the magnetic tape is exposed to the outside; and sliding means for sliding the front cover from a position that the front cover is rotated by the rotation means in such a direction that the front cover moves away from the magnetic tape in the opening so that the front cover is positioned toward rotation in the direction in which the loading posts are entered into the opening.

In a preferred embodiment, the sliding means slides the front cover in the direction in which the loading posts are entered into the opening, when the front cover is moved away from the magnetic tape in the opening.

Alternatively, the tape cassette comprises a housing having a pair of projections at both side portions on a front surface thereof, the pair of projections forming an opening therebetween in which a plurality of loading posts are entered, and having tape running apertures; a pair of tape reels rotatably disposed in the housing; a magnetic tape disposed in the housing and carried on the tape reels and stretched through the tape running apertures of the projections by the loading posts in such a manner that the tape is exposed to the outside; a slider slidably mounted on the housing, the slider having a front portion located in the opening; a front cover having a pair of leg portions supported by both the slider end housing in such a manner that the front cover and the front portion of the slider covering the magnetic tape exposed to the outside; and shifting means for rotating the front cover in the direction in which the loading posts are entered into the opening, and sliding the front cover in such a direction that the front cover moves away from the magnetic tape so that in accordance with the movement of the slider in a direction that the front portion moves away from the magnetic tape, the magnetic tape is exposed to the outside.

In a preferred embodiment, each leg portion is located between the housing and the slider.

In a preferred embodiment, the slider comprises faces for covering the opening of the housing, and slots for allowing the leg portions to fit in accordance with the rotation of the front cover.

In a preferred embodiment, the each leg portion comprises a shaft adapted to fit in a guide groove produced on the side wall of the housing, and a guide slot for enabling a guide post produced on each side wall of the housing to slidably fit in, the guide slot being brought into a perpendicular position to the guide groove when the front cover covers the magnetic tape.

In a preferred embodiment, the tape cassette further comprises means for stopping the front cover from rotation when the slider remains motionless.

In a preferred embodiment, each leg portion is provided with a second guide slot extending in parallel with the guide slot, and the housing is provided with a second guide post adapted to fit in the second guide slot in accordance with the movement of the front cover effected by the shifting means.

In a preferred embodiment, the guide slot of each leg portion is diverged in such a manner that the front cover is further rotated in the direction in which the loading posts ere entered into the opening.

Alternatively, the tape cassette comprises a housing having a pair of projections et both side portions on a front surface thereof, the pair of projections forming an opening therebetween in which a plurality of loading posts are entered, and having tape running apertures; a pair of tape reels rotatably disposed in the housing; a magnetic tape disposed in the housing and carried on the tape reels and stretched through the tape running apertures of the projections by the loading posts in such a manner that the tape is exposed to the outside; a slider slidably mounted on the housing, the slider having a front portion located in the opening; a front cover having a pair of leg portions supported by both the slider and housing in such a manner that the front cover and the front portion of the slider covering the magnetic tape exposed to the outside at the opening; and rotation means for rotating the front cover in the direction in which the loading posts are entered into the opening, in accordance with the movement of the slider away from the magnetic tape so that the magnetic tape is exposed to the outside at the opening.

In a preferred embodiment, the tape cassette further comprises a sliding means for sliding the front cover from a position at which the front cover is rotated by the rotation means in such a direction that the front cover moves away from the magnetic tape in the opening, and rotating the front cover in the direction in which the loading posts are entered into the opening.

In a preferred embodiment, each leg portion is located between the housing and the slider.

In a preferred embodiment, each leg portion is provided with a first guide slot for enabling the shaft to slidably fit in, and a second guide slot for enabling a guide post of the housing to loosely fit in, and wherein the front cover is rotated by the linkage between the shaft and the guide slot, and between the guide post and the second guide slot.

Thus, the invention described herein makes possible the objectives of (1) providing a tape cassette which has a sufficient space for allowing the loading posts and other auxiliary members to maneuver without increasing the size or especially height of the tape cassette, and (2) providing a tape cassette which requires no complicated mechanism for rotating the front cover.

BRIEF DESCRIPTION OF THE DRAWINGS

This invention may be better understood and its numerous objects and advantages will become apparent to those skilled in the art by reference to the accompanying drawings as follows:

FIG. 3 is an exploded perspective view showing a part of the cassette of FIG. 1;

FIG. 15 is a plan view of a third example of the cassette according to the invention;

FIG. 20 is a side view illustrating the subsequent aspect of the operation of FIG. 19;

FIG. 22 is a side view illustrating the operation of a modified version of the cassette of FIG. 15;

DESCRIPTION OF THE PREFERRED EMBODIMENTS

Example 1

Figure 1:
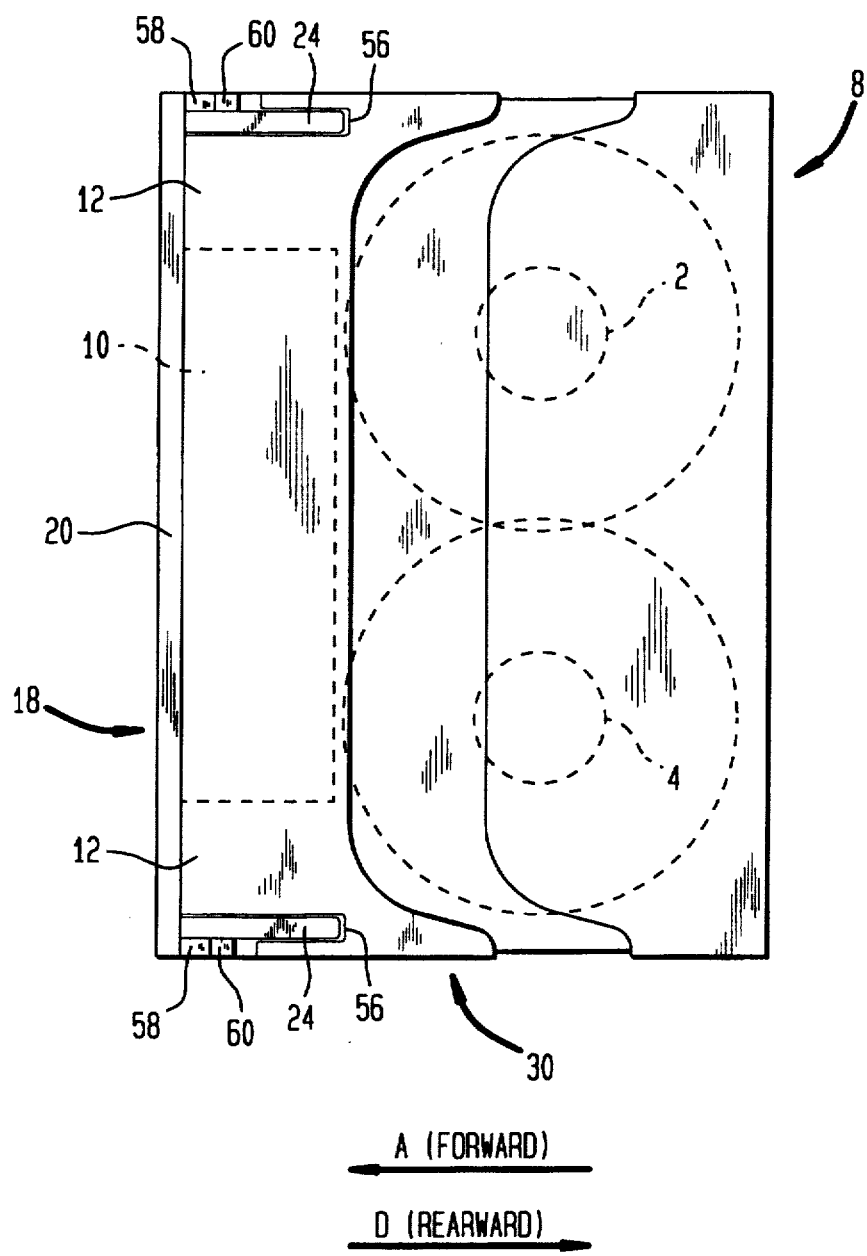
FIG. 1 is a plan view of the cassette as a first example of the present invention.
Figure 2:
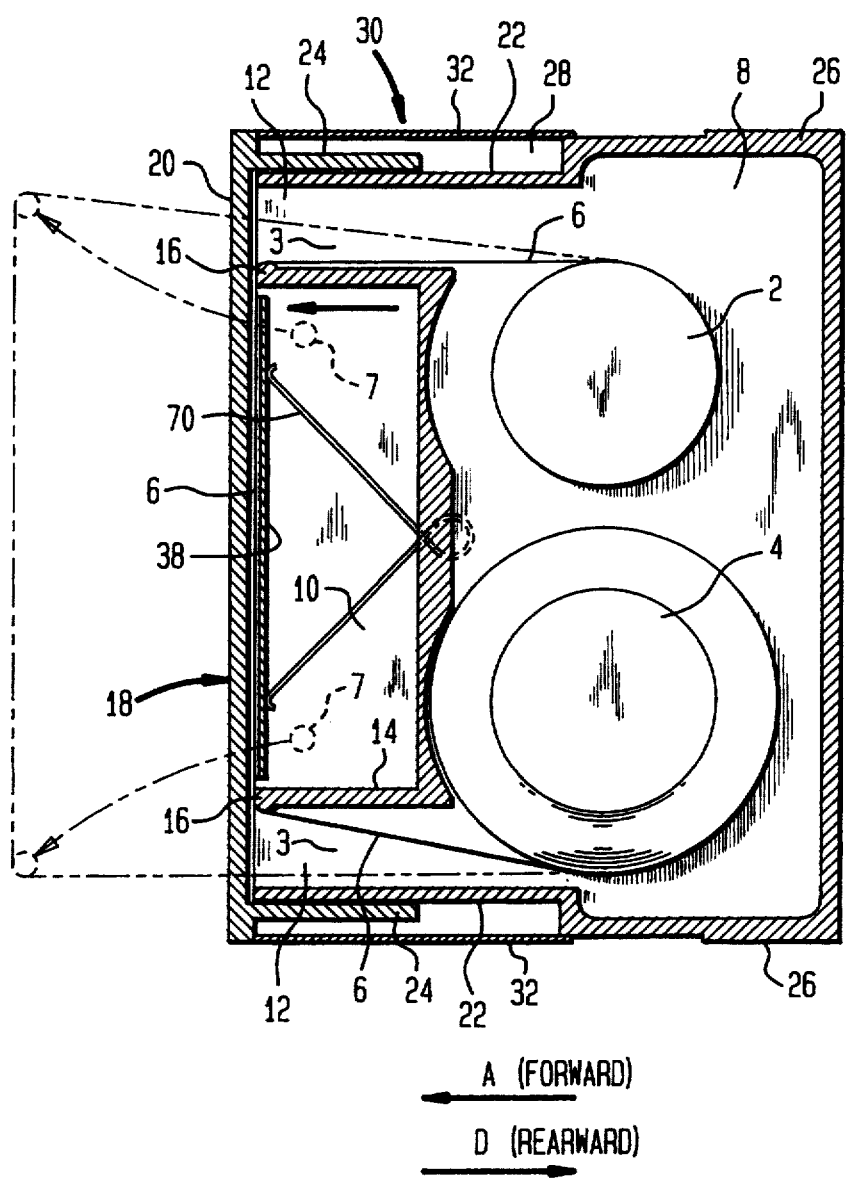
FIG. 2 is a cross-sectional plan view of the cassette of FIG. 1.

Referring to FIGS. 1 to 9, the illustrated cassette has a cassette housing 8 including a tape 6 carried on a first reel 2 and a second reel 4. The cassette housing 8 will hereinafter be referred to as the "housing". The tape 6 is stretched in an opening 10 of the housing 8 as shown in FIG. 2. The opening 10 is defined at opposite sides by a pair of projections or projecting parts 12 of the housing 8. The projecting parts 12 are integrally formed at two side portions of a front surface of the housing 8. The tape 6 is carried on the first reel 2 and the second reel 4 between which the tape is extended through apertures 3 of the projection parts 12. Hereinafter, these apertures 3 will be referred to the "tape running aperture".

The tape 6 is stretched by a pair of loading posts 7 which are maneuvered in the opening 10. The number of the loading posts may be more than two, end be non-symmetrically located unlike FIG. 2. Each projecting part 12 is provided with a guide 16 whereby the running of the stretched tape 6 is facilitated.

Each of the opposite outer side walls of the housing 8 includes an outer side wall 26 and a side portion 22 of the projecting parts 12 with recesses 28 interposed therebetween. The opening 10 of the housing 8 is covered by a front cover 18, thereby covering the tape running apertures 3 of the projecting parts 12. The front cover 18 includes a front face 20 and a pair of leg portions 24 which extend alongside the outer side portions 22 of the projecting parts 12 and are accommodated in the recesses 28.

Figure 5A:
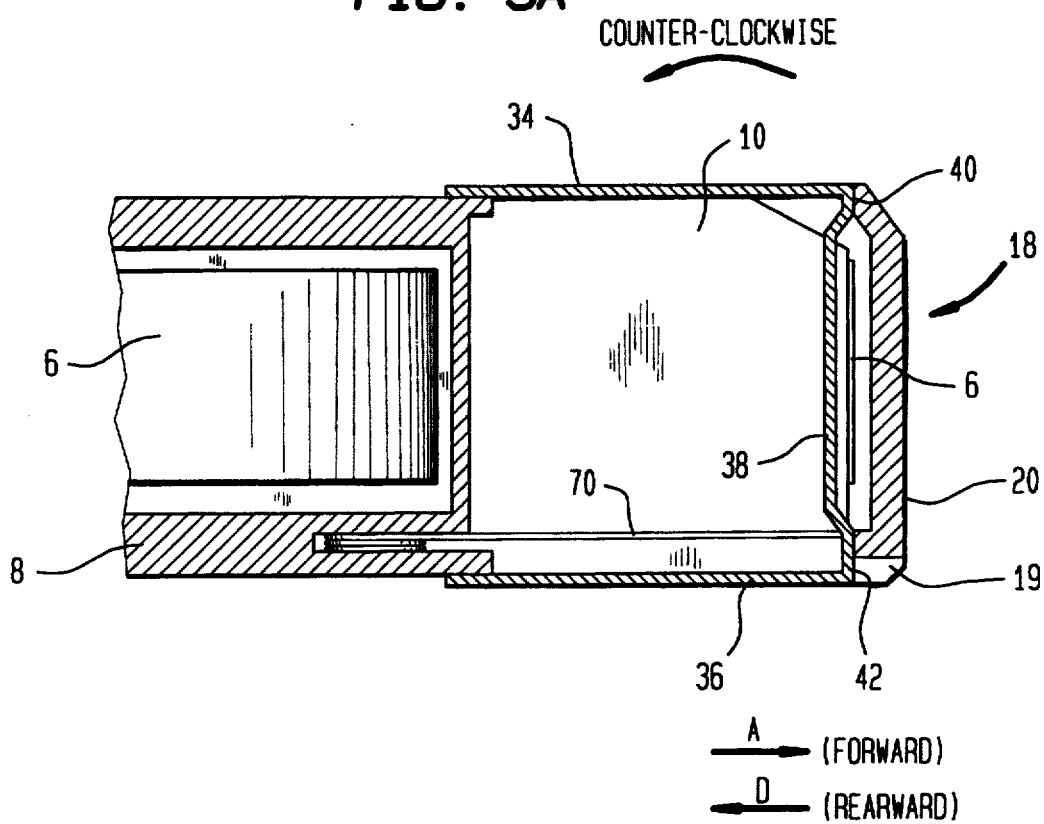
FIGS. 5A and 5B are cross-sectional side views of the main part of the cassette of FIG. 1.

The reference numeral 30 denotes a slider capable of sliding forwardly and rearwardly. In this specification, "forward" means a direction away from an operator standing in front of the apparatus (in FIG. 1 and 5A, the direction of arrow A), and "rearward" means a direction toward the operator (in FIGS. 1 and 5A, the direction of D). As shown in FIG. 3, the slider 30 includes side portions 32 along the leg portions 24 of the front cover 18, a top portion 34 covering the upper portion of the opening 10 disposed between the pair of projecting parts 12, and bottom portion 36 covering the lower portion of the opening 10, and a front portion 38 covering the front face 20 of the front cover 18 formed between the top portion 34 and the bottom portion 36. The projecting parts 12 of the housing 8 are inserted into square-shaped apertures formed between the front portion 38 and each side portion 32. The front portion 38 has projecting head portions 40 and 42 as shown in FIG. 5A, which come into engagement with the front face 20 of the front cover 18. The tape 6 is passed between the front portion 38 of the slider 30 and the front face 20 of the front cover 18. The front face 20 includes a recess 19 (FIG. 5a) through which the lower projecting head portion 42 is exposed.

The top, the bottom and the side walls of the housing 8 are adequately cut so that the slider 30 can slide thereon. Each side portion 32 of the slider 30 is extended forwardly beyond the leg portions 24 so as to cover the recesses 28 completely. As a result, when the slider 30 slides forwardly to its full extent, the leg portions 24 are completely covered by the side portions 32 of the slider 30.

Figure 4:
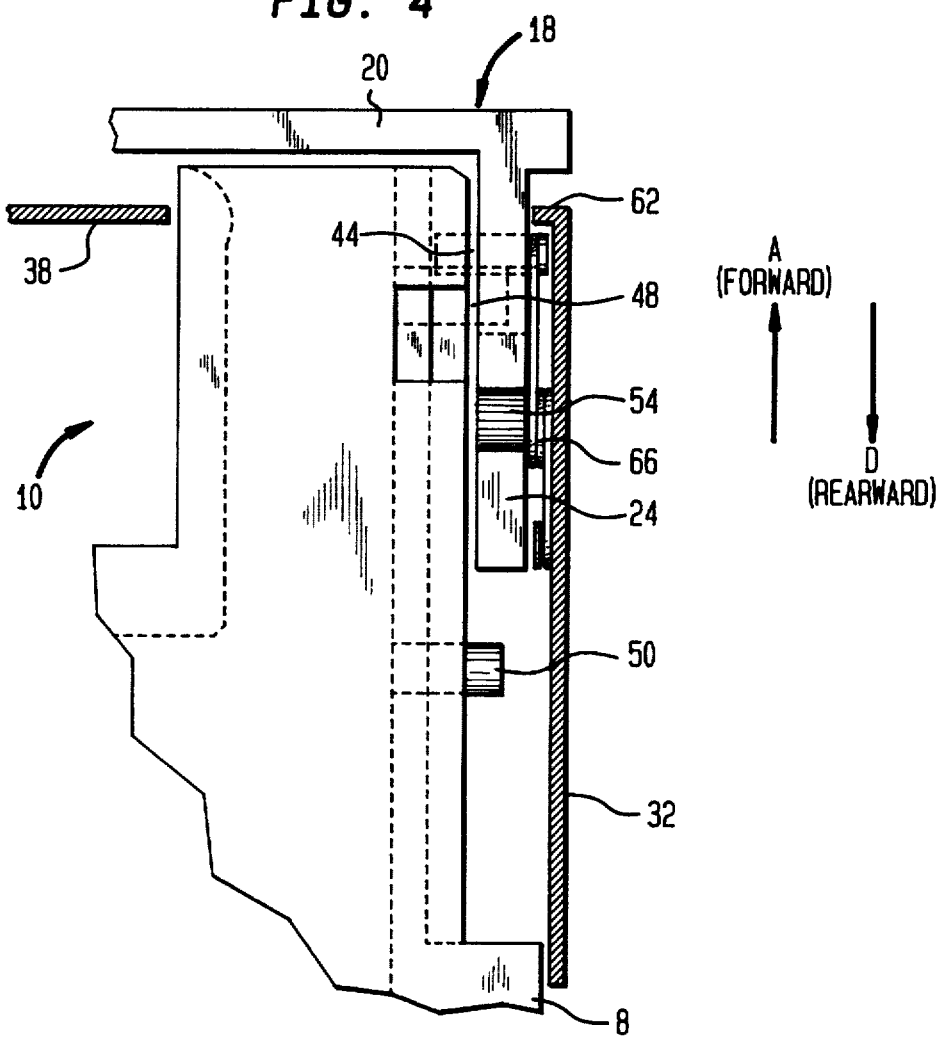
FIG. 4 is a plan view on an enlarged scale showing a main part of the cassette of FIG. 1.

Referring to FIGS. 3 and 4, the front cover 18 and the slider 30 will be described, wherein only one side of them will be described and the other side will be omitted for simplicity:

The leg portion 24 is provided with a shaft 44 passed therethrough, which slides in and along a guide groove 46 of the projecting part 12. The outer side wall 22 of the projecting part 12 is provided with a first guide post 48 and a second guide post 50. The first guide post 48 is located adjacent to the guide groove 46, and the second guide post 50 is located lower than the first guide post 48. The leg portion 24 of the front cover 18 is provided with a first guide slot 52 and a second guide slot 54 which are cut in opposite directions as shown in FIG. 3. The first guide slot 52 is located closer to the front face 20 as compared with the second guide slot 54. More specifically, the first guide slot 52 has an open end at its lower end portion, and the second guide slot 84 has an open end at its upper end portion. When the first guide post 48 slidably fits in the first guide slot 52, the front cover 18 covers the opening 10 of the housing 8, thereby enabling the front cover 18 to rotate upwardly around the first guide post 48. When the front cover 18 covers the openings 10 of the housing 8, the second guide post 50 does not fit into the second guide slot 54 but is urged to fit therein from the open end when the front cover 18 is rotated upwardly and the leg portion 24 is rotated at 90°.

The top portion 34 of the slider 30 is provided with slits 56 having en open end in the front edge which allow the insertion of the leg portions 24 of the front cover 18 in accordance with the upward movement of the front cover 18. The open end of the slit 56 is toward the front of the housing 8, and has a wider portion 58 which is restricted by a stopper 60 located above the shaft 44 and projected into the slit 56. The side portion 32 of the slider 30 is provided with a contact portion 62 which comes into engagement with the shaft 44. The front cover 18 is normally prevented from rotation by the shaft 44 held by the stopper 60 but when the slider 30 slides rearward (in the direction of arrow D) thereby to place the shaft 44 in engagement with the contact portion 62, the wider portion 58 is located above the shaft 44 and guides it therein. In this way the leg portions 24 of the front cover 18 are guided into the slits 56 and moved upwardly. The counter-clockwise rotation (in FIGS. 5A and 5B) Of the leg portion 24 enables the front face 20 of the front cover 18 to move upward.

Figure 5B:
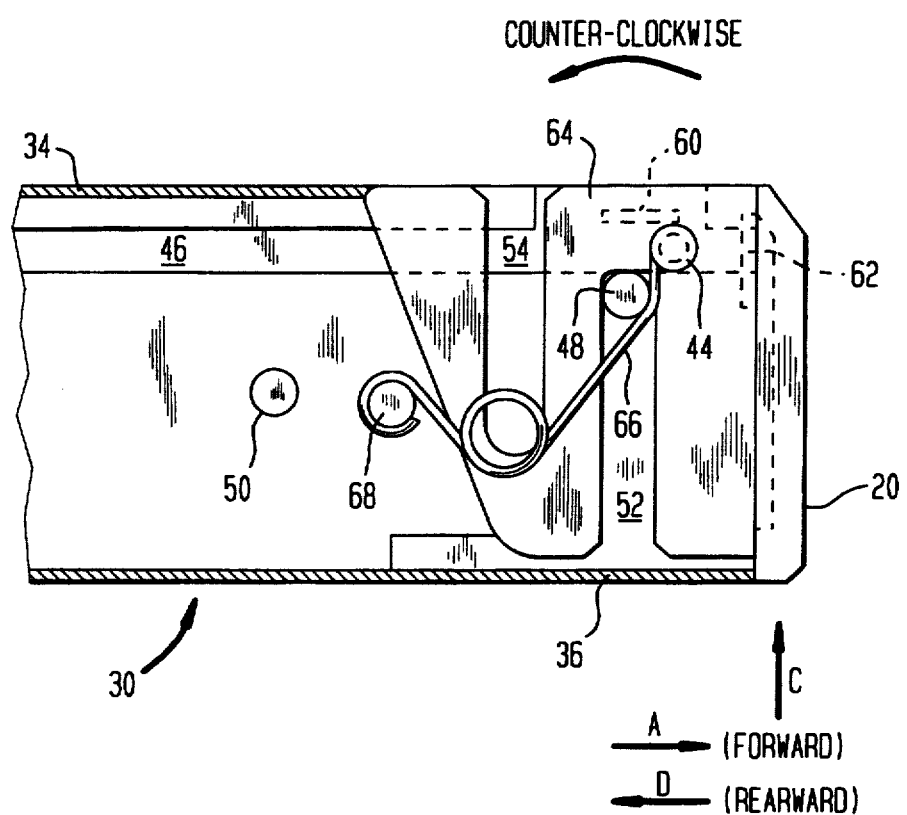

The guide groove 46 is provided with an open recess 64 (FIG. 3) located in opposition to the stopper 60. The shaft 44 integral with the leg portion 24 projects toward the side portion 32, and is tied to one end of a spring 66 having a coiled portion as shown in FIG. 5B. The other end of the spring 66 is tied to a pin 68 provided on the side portion 32 of the slider 30. Thus the shaft 44 is downwardly loaded.

The bottom of the housing 8 is provided with a second spring 70 having a coil portion which is located in the center of the opening 10. The opposite ends of the second spring 70 are kept in engagement with the projecting head portions 42 of the slider 30, as shown in FIG. 5A. The spring 70 pushes the front portion 38 of the slider 30 forwardly, thereby placing the projecting head portions 40 and 42 in contact with the upper part and the lower part of the front face 20. In this way the projecting head portions 40 and 42 of the slider 30 are kept in contact with the front face 20 of the front cover 18, thereby protecting the tape 6 against any inadvertent damaging.

It is arranged so that the second spring 70 is stronger than the first spring 66, thereby ensuring that when the front cover 18 is subjected to a force in the direction of arrow A in FIG. 5A which urges it to rotate, the slider 30 and the front cover 18 are stably positioned under the pressure provided by the two spring 66 and 70. If a force acts on the front face 20 in the direction of arrow C in FIG. 5B so as to cause the front cover 18 to open, the front cover 18 is rotated around the guide post 18 but stopped by the engagement of the shaft 44 with the stopper 60 from rotating upwardly.

An example of the operation of the cassette will be described:

A cassette is placed into the apparatus from the front face 20 of the front cover 18. A pusher (not shown) provided in the apparatus pushes the lower projecting head 42 of the slider 30 in the direction of arrow D in FIG. 5A and FIG. 6. The slider 30 slides in the direction of arrow D against the spring 70. As shown in the dotted line in FIG. 6, the contact portion 62 comes into engagement with the shaft 44, and the stopper 60 moves away from the upper portion of the shaft 44, thereby enabling the wider portion 58 to locate above the shaft 44. At this stage, the cassette is additionally pushed into the apparatus, thereby pushing the slider 30 in the direction of arrow D (rearward). The shaft 44 is pushed by the contact portion 62, thereby enabling the leg portions 24 to follow the backward movement thereof. In accordance with the movement of the leg portions 24, the first guide slot 52 takes a vertical position, and the first guide post 48 fits in the slot 52. Thus, the shaft 44 is stopped from moving but is guided into the open recess 64 and then the wider portion 58. In this way the leg portions 24 are rotated around the first guide post 48, thereby raising the front face 20 of the front cover 18. Since the shaft 44 moves in accordance with the sliding movement of the slider 30, the strength of the first spring 66 tied thereto is reduced, thereby facilitating the rotation of the front cover 18 without sustaining a counter-acting force of the spring 66.

Figure 6:
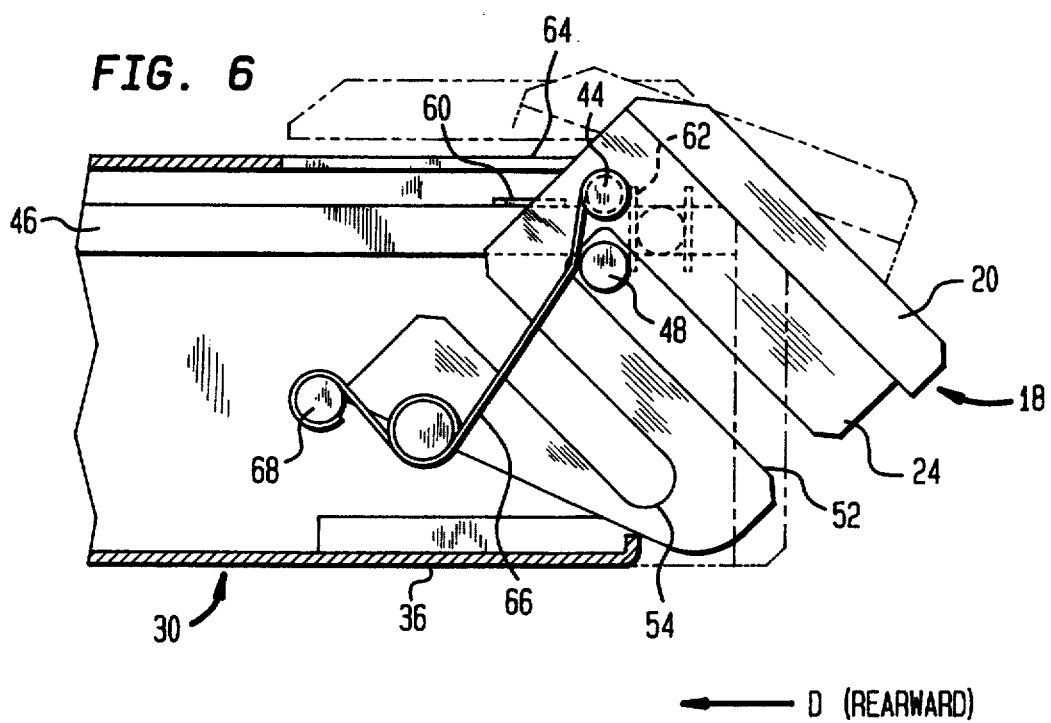
FIG. 6 is a cross-sectional view illustrating the operation of the cassette of FIG. 1.

In this way, as the slider 30 slides in the direction of arrow D, the leg portions 24 rotates upwardly around the first guide post 48 st 45° and takes a position above the guide post 48 as indicated by the full line in FIG. 6. At this stage, the second guide slot 54 is diagonally inclined at 45°. Furthermore, the slider 30 is moved rearwardly, and when a rearward moving force acts on the shaft 44, the force acts on the leg portions 24, and pushes the first guide post 48 in the direction of arrow D (rearward). Since the guide slot 52 is included at 45°, the guide post 48 is caused to slide therein. In this way the front cover 18 is upwardly rotated. Thus, the shaft 44 fits in the guide groove 46. As the slider 30 is further moved in the direction of arrow D (rearward), the shaft 44 is moved in and along the guide groove 46, while the guide post 48 moves in and along the first guide slot 52. In This way The front face 20 and the leg portions 24 are caused to slide rearwardly and rotate upwardly as shown in the dotted line in FIG. 6.

Figure 7A:
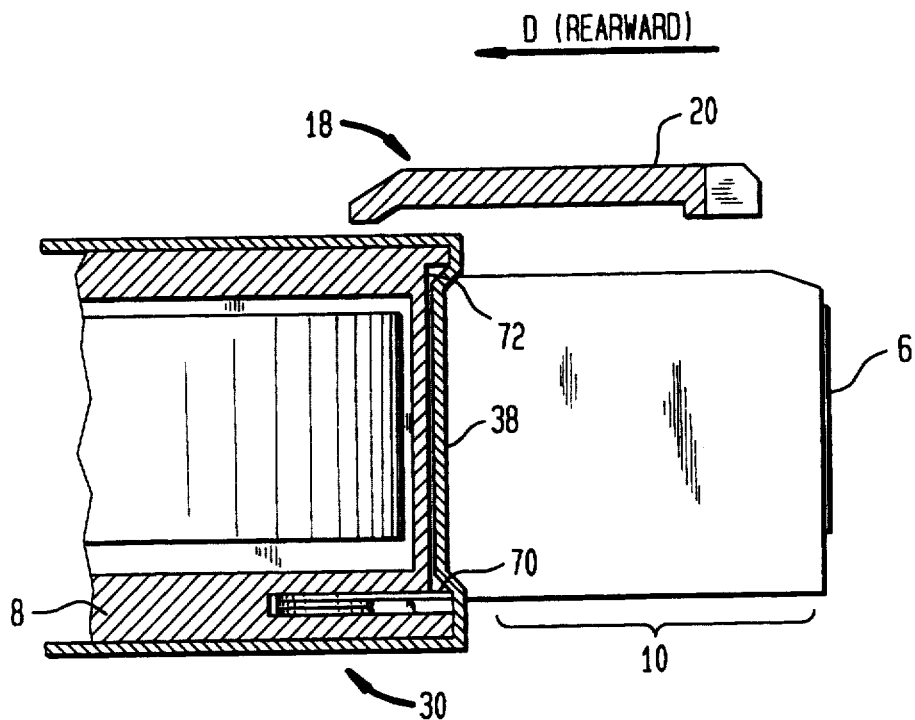
FIGS. 7A and 7B are cross-sectional side views illustrating the operation of the cassette of FIG. 1.
Figure 7B:
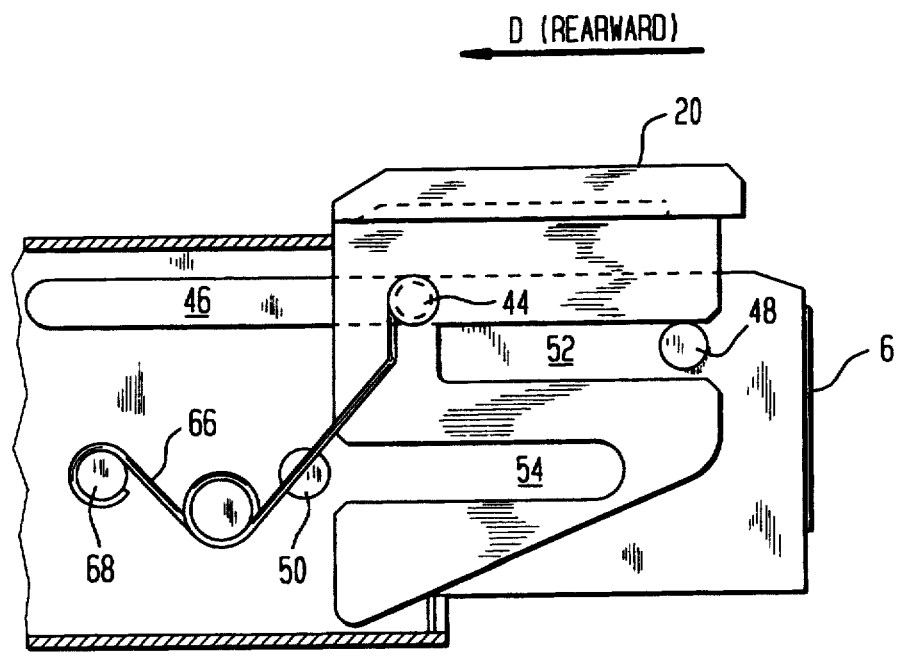

Finally, as shown in FIGS. 7A and 7B, when the front portion 38 of the slider 30 reaches a point adjacent to a rear wall 72 of the housing 8 at the opening 10, the front cover 18 is rotated at 90°, thereby taking an upward position above the opening 10. The tape 6 is stretched from the projecting parts 12 over the guides 16, and exposed free from the front face 20 of the front cover 18. At this stage, the upper portion of the opening 10 is covered by the front face 20 but in accordance with the rearward movement of the slider 30, the lower portion of the opening 10 of the housing 8 is opened free from the bottom portion 36 of the slider 30. Auxiliary members of the apparatus such as guide posts and pinch rollers can be inserted into the opening 10 from below. The leg portions 24 are prevented from moving upwardly and downwardly by the first guide post 48 fitting in the first guide slots 52, and also prevented from moving up and down by the shaft 44 fitting in the guide groove 46. In this way, the front cover 18 keeps the stretched tape 6 exposed to the outside. The second guide slots 54 are horizontally maintained so that the open end thereof is opposed to the second guide post 50.

A rearward force acts on the front face 20 of the front cover 18 in the direction of arrow D in FIG. 7A, thereby forcing the front cover 18 rearwardly. While the front cover 18 moves in the direction of arrow D, the slider 30 is kept motionless, thereby compressing the first spring 66 against the pin 6B fixed to the slider 30 and exerting a force on the front cover 18. Under the exertion of the rearward force, the front cover 18 continues to move in the direction of arrow D (rearward) and the first guide post 48 comes out of engagement with the first guide slot 48. As the front cover 18 moves more rearwardly, the second guide post 50 comes into engagement with the second guide slot 54. Since the second guide post 50 slides in the slot 54, the leg portions 24 are prevented from vertical fluctuation, and the front face 20 of the front cover 18 continues to move rearwardly while taking a horizontal position.

Figure 8A:
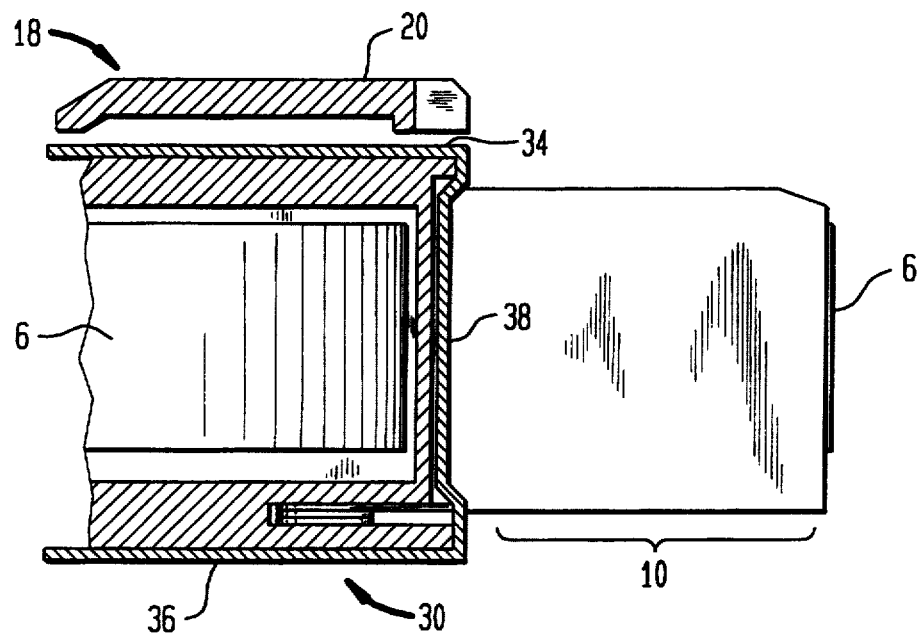
FIGS. 8A and 8B are cross-sectional side views illustrating the operation of the cassette of FIG. 1.
Figure 8B:
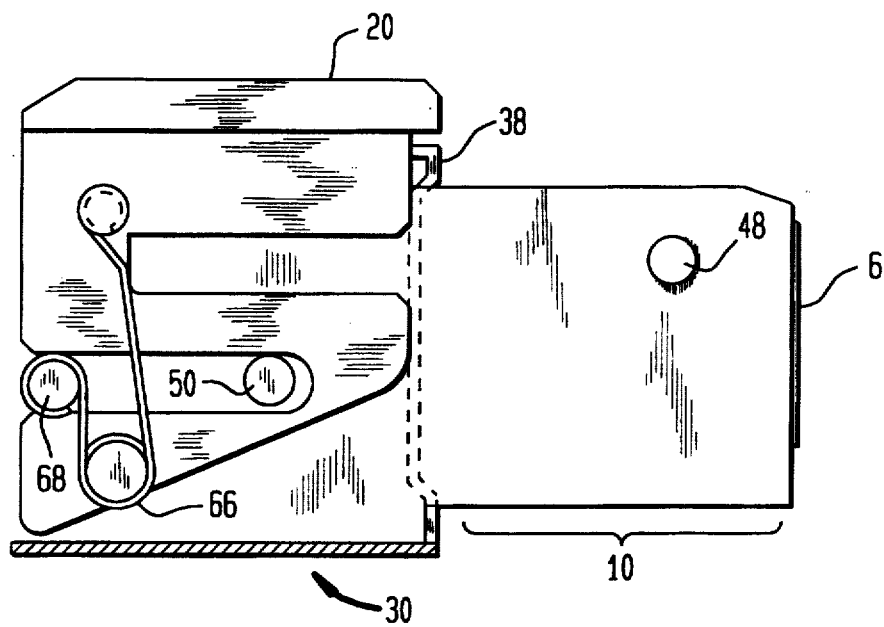
Figure 9:
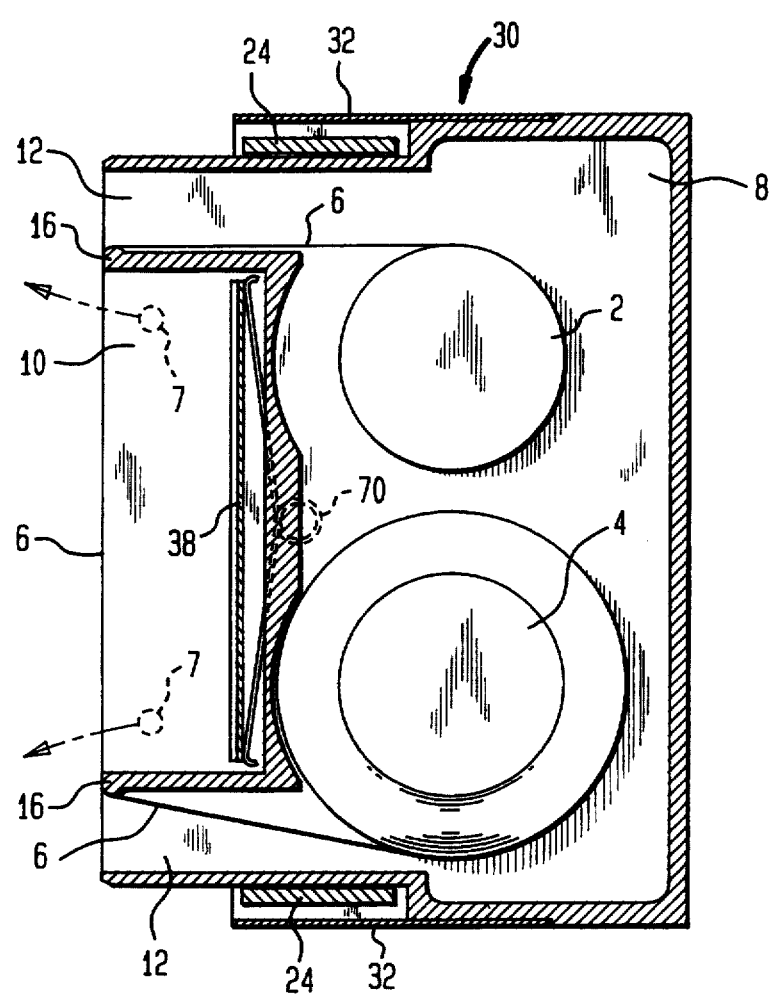
FIG. 9 is a cross-sectional plan view exemplifying the state-shown in FIGS. 8A and 8B.

Finally, the state shown in FIGS. 8A and 8B is reached, where the front face 20 of the front cover 18 rides on the top portion 34 of the slider 30. However, as shown in FIG. 9, the front cover 18 does not position above the top portion of the opening 10 of the housing 8, thereby keeping it fully open. The leg portions 24 of the front cover 18 are covered by the side portions 32 of the slider 30.

In the illustrated example, the rearward movement of the front cover 18 in the direction of arrow D is carried out by applying a rearward force to the front cover 18. However, it is a matter of design to modify the embodiment in such a manner that the rearward movement of the front cover 18 is carried out in association with the rearward movement of the slider 30.

When the cassette is placed on the apparatus, a pair of loading posts 4 are led into the opening 10 of the housing 8 so as to catch the tape 6 and stretch it from the first reel 2 or the second reel 4. The tape 6 is brought to mount on an outer surface of a cylinder housing a rotary magnetic head therein. Then the first reel 2 or the second reel 4 is driven so as to enable the tape 6 to run and the cylinder to rotate. In this way the intended recording or reproduction is achieved.

When the cassette is to be dismounted from the apparatus, the tape 6 is disengaged from the cylinder, and the first reel 2 or the second reel 4 is driven so as to enable the tape 6 to wind around it. The loading posts 4 are withdrawn from the opening 10. Then, the slider 30 is moved in the direction of arrow A (forward), thereby enabling the front cover 18 to move forwardly, and then rotate downwardly until it covers the tape 6.

As described above, the first guide post 48 of the housing 8 fits in the first guide slot 52 of the front cover 18 so as to rotate the front cover 18, thereby ensuring that the tape 6 is kept out of contact with the front cover 18. Thus the front face 20 is kept at a lower position, thereby protecting the tape 6 against any inadvertent damaging.

After the front face 20 is withdrawn in accordance with the forward. sliding movement of the slider 30, the front cover 18 is moved further forwardly under the action of the first spring 66. In this way the front cover 18 is automatically opened and closed in accordance with the rearward and forward movement of the slider 30. This is advantageous in that the tape cassette can be constructed with a reduced number of components such as spring means, without trading off efficiency in the performance.

In addition, the front cover 18 is further rearwardly moved after the tape 6 is exposed and stretched, thereby allowing the smooth insertion of the loading posts 4 in the opening 10 of the housing 8. The slider 30 is moved by inserting the cassette into the apparatus, thereby requiring no extra tool or device for moving the slider.

The tape 6 is interposed in a space maintained between the front face 20 of the front cover 18 and the front portion 38 of the slider 30, thereby keeping the tape 6 out of contact with these components, and closing the space tightly. Thus, the tape 6 is protected against contamination with dust and/or inadvertent damaging. The first spring 66 need not be stronger than the second spring 70 so as to effect the relative movement of the front cover 18 and the slider 30 over a relatively small stroke, thereby eliminating the necessity of using a large spring. A small spring has only a small stress, thereby making it unnecessary to pay special attention to the design. Another advantage is that the small spring exerts a small load on the front cover 18.

Since the leg portions 24 of the front cover 18 are covered by The side portions 32 of the slider 30, thereby ensuring that the slider 30 and the front cover 18 can be overlapped without increasing the thickness of the cassette or having an unsightly protuberance or step on the body of the housing 8. As a result, the appearance of the cassette tape is enhanced. The spring 66 is kept out of sight, thereby eliminating the necessity of paying special attention to design. The slider 30 covers the owning 10 of the housing 8, thereby protecting the tape 6 from being damaged by opening the front cover 18 inadvertently.

While the front cover 18 is closed, it is prevented from rotation unless an excessively strong force acts on the slider 30 beyond the strength of the spring. This protects the tape 6 against any inadvertant damaging by opening the front cover 18 by mistake. The front cover 18 can be locked without using special looking means.

Example 2

Figure 10:
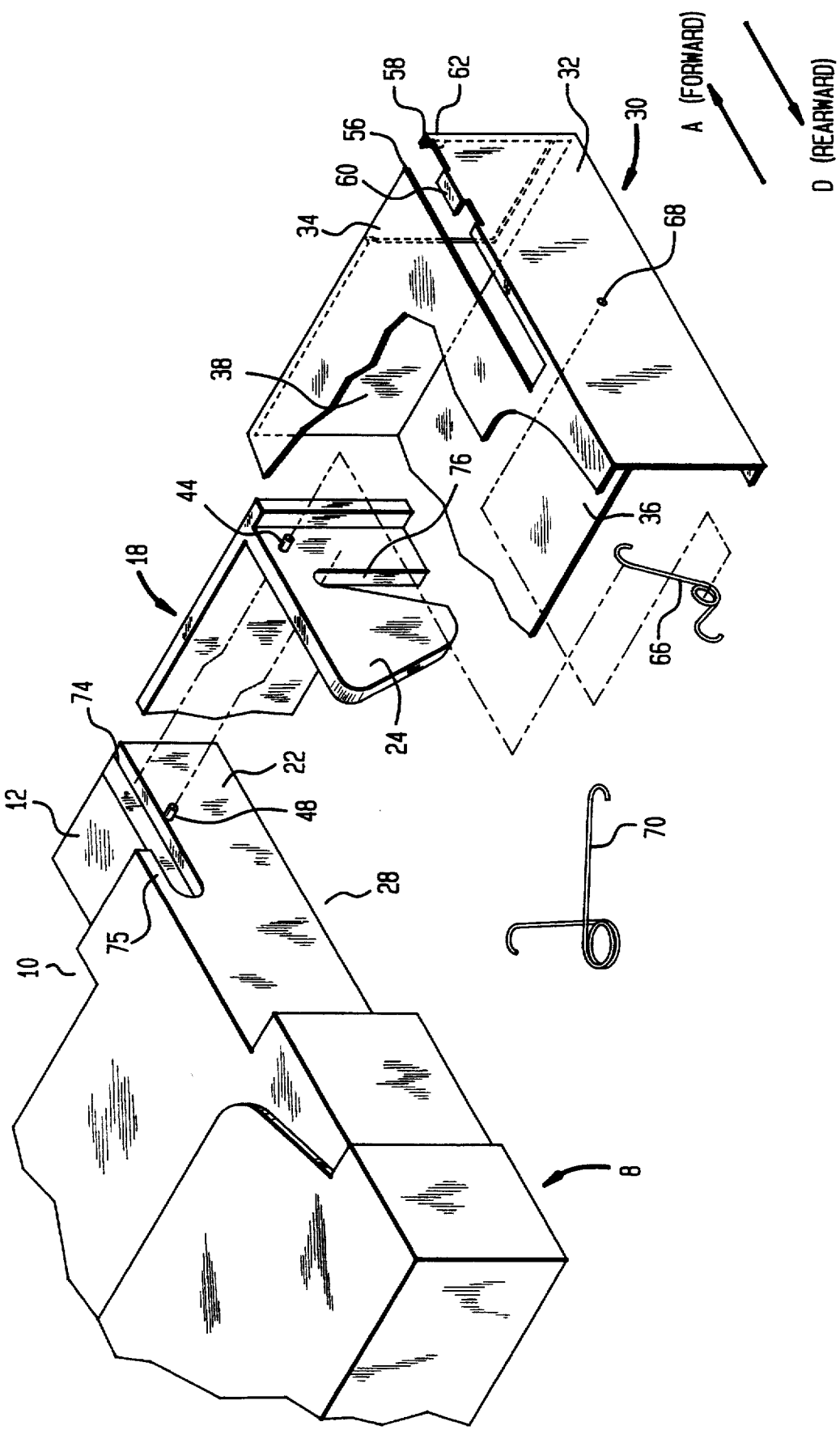
FIG. 10 is an exploded perspective view of a main part of a second example of the cassette according to the invention.
Figure 11:
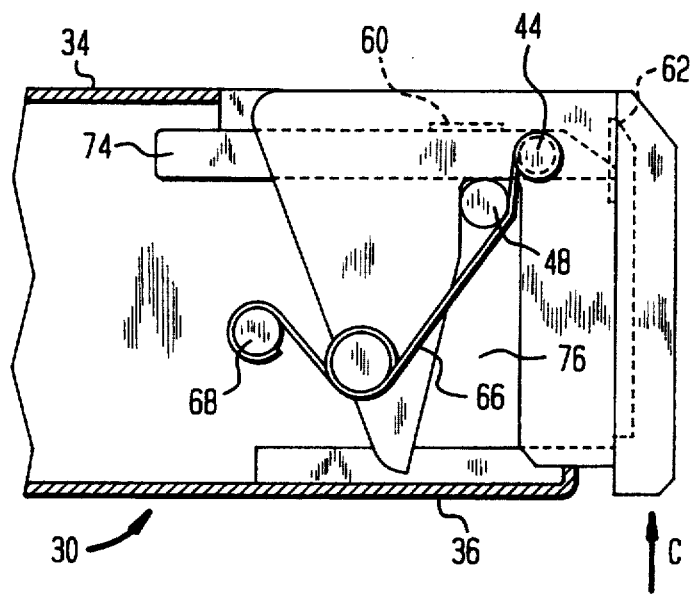
FIG. 11 is a cross-sectional side view of the cassette of FIG. 10.

Referring to FIGS. 10 to 15, another example will be described, which is only different from the first example in the leg portions 24, a guide groove 74, and the guide slot 76:

The leg portion 24 is provided with a single guide slot 76, which has a straight inner surface and a divergent inner surface including an upper straight portion which is parallel to the opposite straight inner surface. When the front cover 18 is not rotated, both side walls thereof extend downwardly as shown in FIG. 10.

The guide groove 74 of the projecting part 12 is open at the top except for the roofed end 75, and the shaft 44 of the front cover 18 slides in and along the guide groove 74 in accordance with the movement of the front cover 18.

Figure 12:
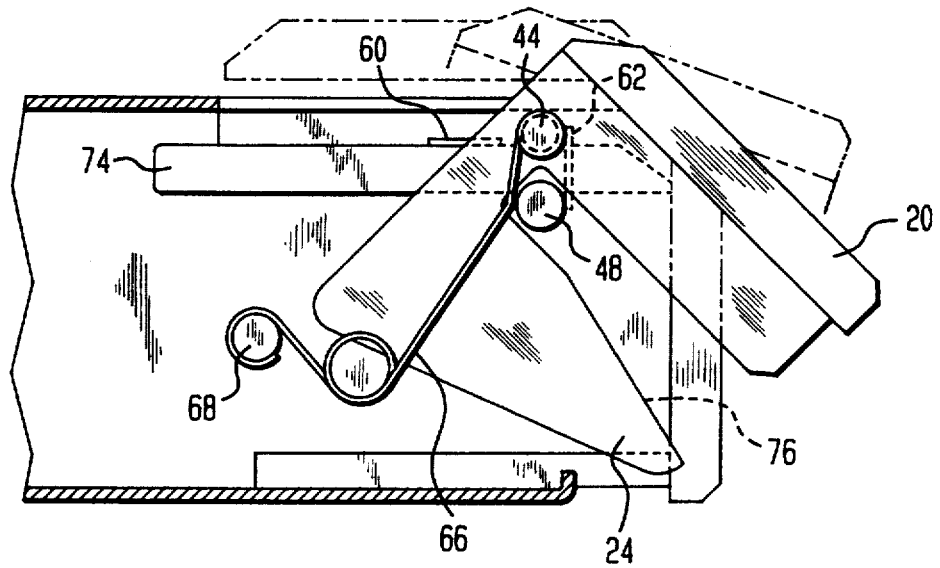
FIG. 12 is a cross-sectional side view illustrating the operation of the cassette of FIG. 10.
Figure 13A:
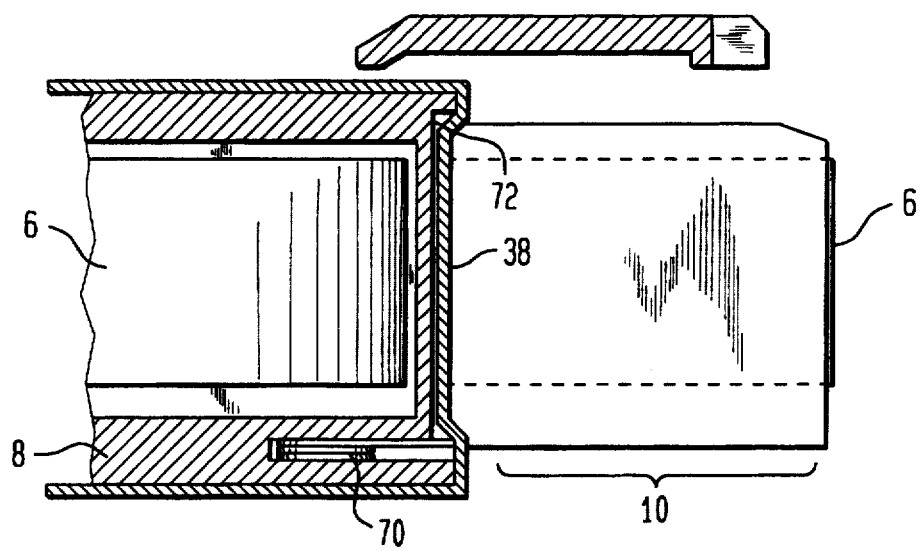
FIGS. 13A and 13B are cross-sectional side views illustrating the operation of the cassette of FIG. 10.

Under this construction, the slider 30 is moved in the direction of arrow D (rearward) against the spring 70, thereby placing the contact portion 62 into engagement with the shaft 44. Thus, the stopper 60 is released from the shaft 44, and the slider 30 continues Go be moved rearwardly until the shaft 44 is caused to rotate upwardly around the guide post 48. In this case, because of having no obstruction in and above the open top of the guide groove 74, the shaft 44 is smoothly rotated. As shown in FIG. 12, when the shaft 44 As rotated around the guide post 48, the leg portion 24 and the front face 20 of the front cover 18 are upwardly rotated at 45°. The slider 30 continues to move rearwardly, whiled the front cover 18 is upwardly rotated. The subsequent rearward movement of the slider 30 causes the guide post 48 to move in and along a front portion of the guide groove 76 and the shaft 44 is moved An and along the guide groove 74. In this way, as shown in the dotted line in FIG. 12, the leg portions 24 and the front face 20 are upwardly rotated while moving rearwardly and downwardly. As shown in FIG. 13, when the slider 30 is moved up to the rear wall 72 of the housing 8 at the opening 10, the front cover 18 is rotated virtually at 90° until its horizontal state is reached and it takes a position above the opening 10. In this way, the tape 6 is completely exposed. At this stage, the shaft 44 is located at the roofed end 75 of the guide groove 74, whereby a further movement of the shaft 44 by the contact portion 62 is prevented.

Figure 13B:
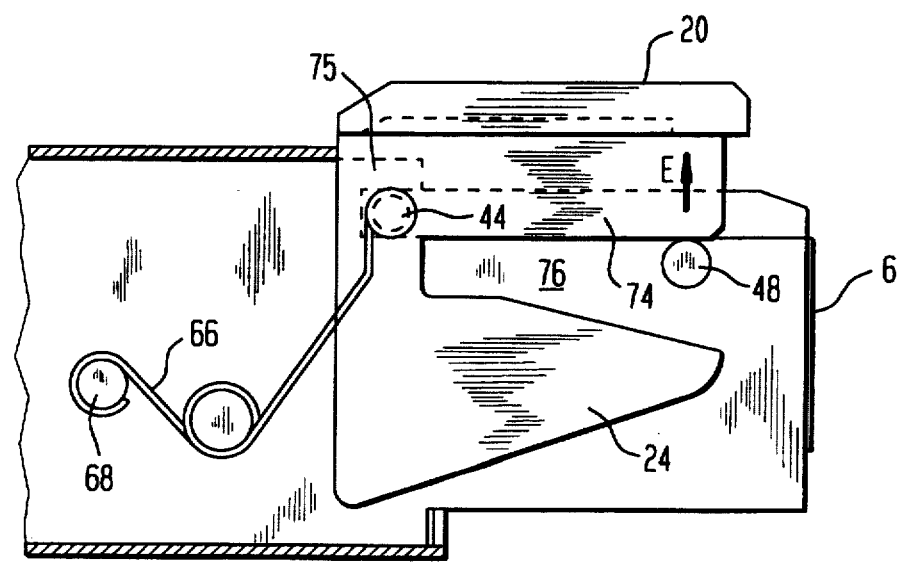
Figure 14A:
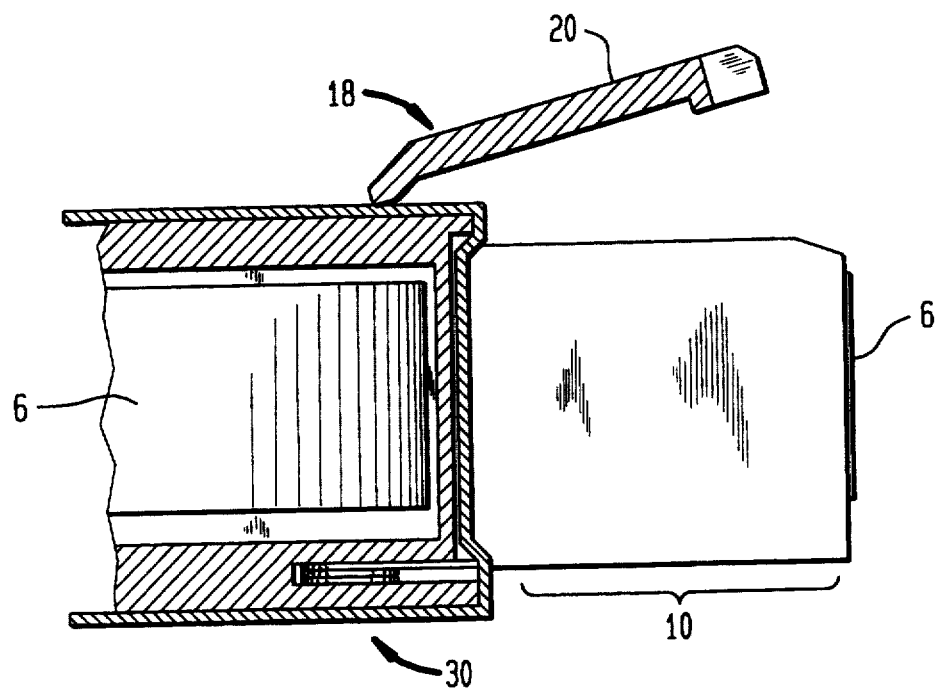
FIGS. 14A and 14B are cross-sectional side views illustrating the operation of the cassette of FIG. 10.
Figure 14B:
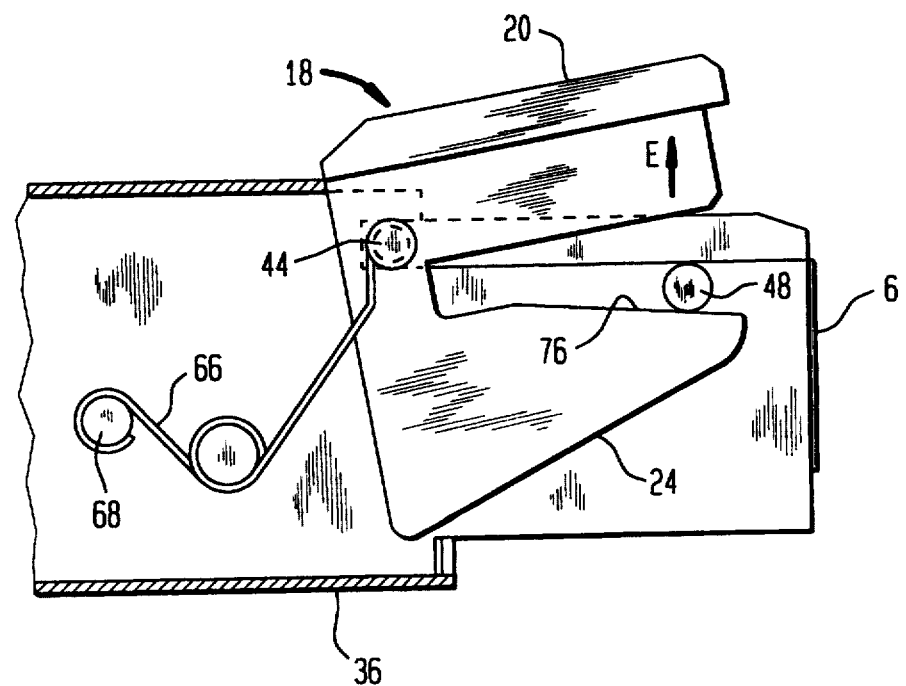

At this stage, even if a force is applied to the front face 20 of the horizontally maintained front cover 18 in the direction of arrow E in FIG. 13B, the shaft 44 is prevented by the roofed end 75 of the guide groove 74 from moving upwardly, and by the contact portion 62 from moving forwardly. The guide post 48 is situated at the divergent inner surface of the guide slot 76, thereby allowing the front cover 18 to move upwardly around the shaft 44 until the guide post 48 comes into engagement with the divergent inner surface of the guide slot 76 as shown in FIG. 14B, where the rotation of the front cover 18 is stopped.

In this way, the front cover 18 is upwardly rotated and it takes a horizontal position above the opening 10 of the housing 8. The front cover 18 continues to rotate so that the loading posts 7 are allowed to move into the opening 10 wherein the space can have a sufficient size to accommodate relatively large loading posts.

Example 3

Referring to FIGS. 15 to 22, a third example of the embodiment will be described, wherein like numerals designate similar members in Examples 1 and 2. In FIGS. 15, 18 to 20, and 22, only one side of the cassette will be described, and the other side will be omitted for simplicity:

The housing 8 is composed of halved portions; that is, an upper portion 78 and a lower portion 80. The upper portion 78 includes a recess 82 located at a forward section, and the lower portion 80 includes a recess 84 at a forward section. Each recess 82 and 84 includes a step 86 in the depth thereof.

The housing 8 includes a first reel 2 and a second reel 4, and a tape 6 is carried on these reels, and stretched out through the tape running aperture 3 of the projecting parts 12 of the housing 8. The projecting part 12 is provided with a guide portion 16 at a point adjacent to the tape running aperture 3. The tape 6 passes over the guides 16 in a stretched state and covers the front portion of the opening 10 of the housing 8.

Figure 16:
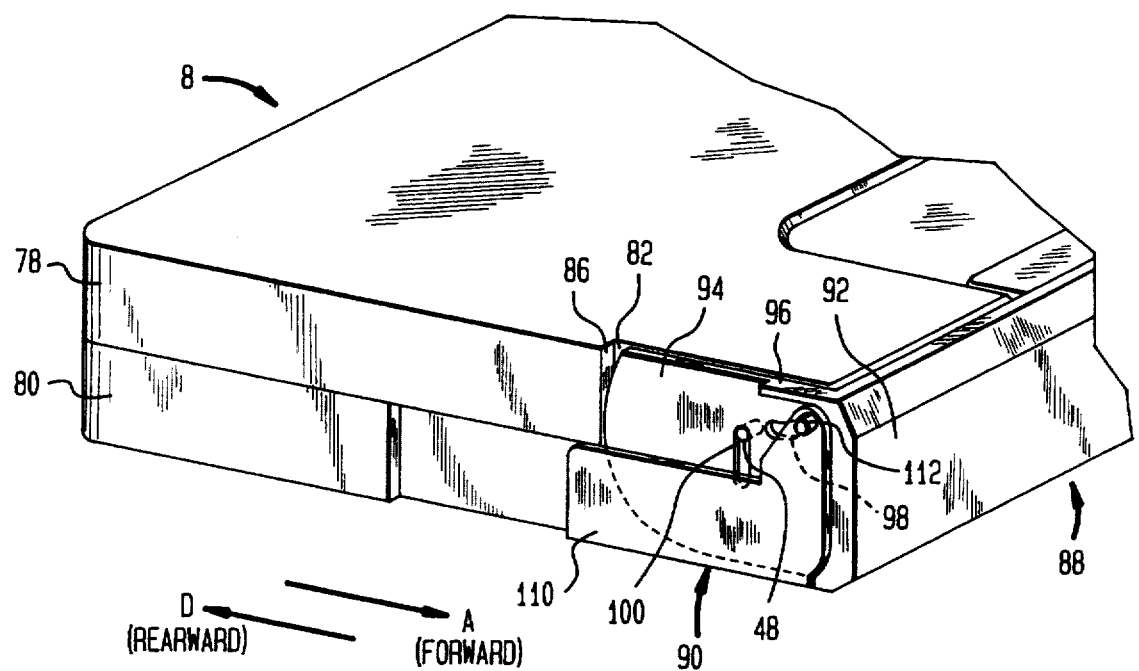
FIG. 16 is a perspective view of a main part of the cassette of FIG. 15.

The reference numeral 88 denotes a front cover rotatably disposed and covering the stretched tape 6. The front cover 88 includes a front face 92, and leg portions 94 on opposite sides (FIG. 16). The leg portions 94 are located in the recesses 82 and 84. The cassette cover 88 in rotated by a slider 90 disposed in the front of the housing 8.

The leg portion 94 is made from a rectangular plate, including an abutment 96 extending outward, and has an arched portion, a first guide slot 98, and a second guide slot 100. The second guide slot 100 allows a guide post 48 erected on the side of the projecting part 12 to slide therein.

Figure 17:
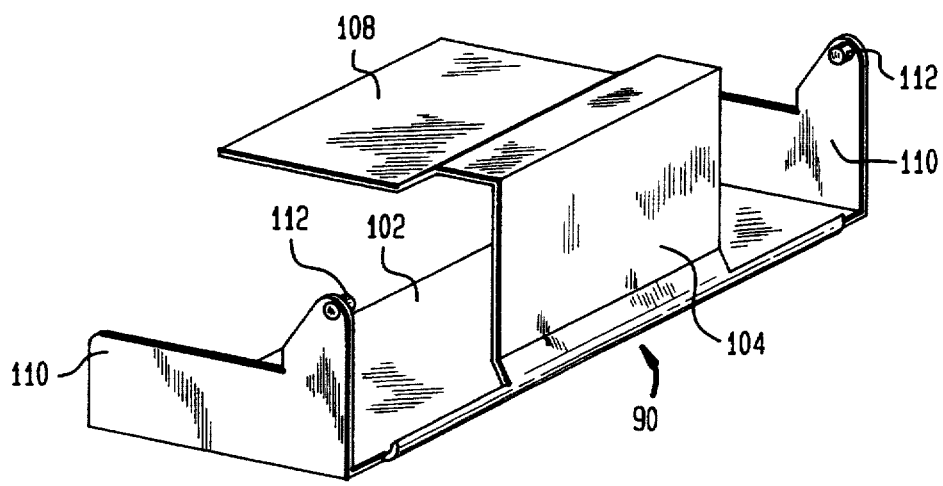
FIG. 17 is a perspective view of a slider.
Figure 18:
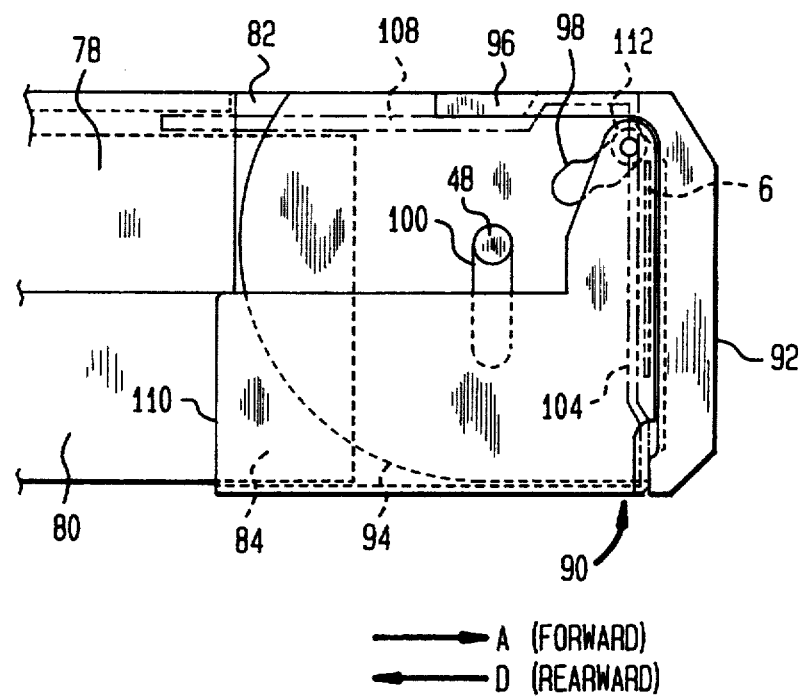
FIG. 18 is a side view of the main part of the cassette of FIG. 15.

As shown in FIG. 17, the slider 90 is made by shaping a plate so as to have a bottom portion 102, a front portion 104, a top portion 108, and side portions 110. The front portion 104 has a reinforcing protruded portion. The slider 90 is slidable along the outer surfaces of the housing 8, and is normally loaded in the direction of arrow A (forward) by a spring shown).

The top portion 108 of the slider 90 extends beyond the rear end of the opening 10 of the housing 8.

The side portions 110 are as high as the lower portion 80 of the housing 8 except for the rearward part which is slightly lower than the height of the upper portion 78 of the housing 8. The lower portion 80 has cutaway portions which allow the side portions 110 of the slider 90 to fit in. Each side portion 110 of the slider 90 is provided with a shaft 112 extending inwardly, which is slidably supported in the first guide slot 98.

The slider 90 is moved in the direction of arrow D (rearward) against the spring by applying a force to the front 104 thereof, thereby causing the shafts 112 to slide in and along the first guide slots 98. Since the first guide slot 98 ia diagonally inclined, the shafts 112 smoothly slide therein. Thus the leg portions 94 are upwardly rotated around the guide posts 48. The guide post 48 slides in and along the second guide slot 100, thereby allowing the front cover 88 to rotate upwardly while sliding forwardly. In this way the front cover 88 positioning in front of the stretched tape 6 between the guides 16 is upwardly rotated while the front face 92 is sliding rearwardly. Because of the arched configuration, the leg portions 94 are smoothly rotated.

Figure 19:
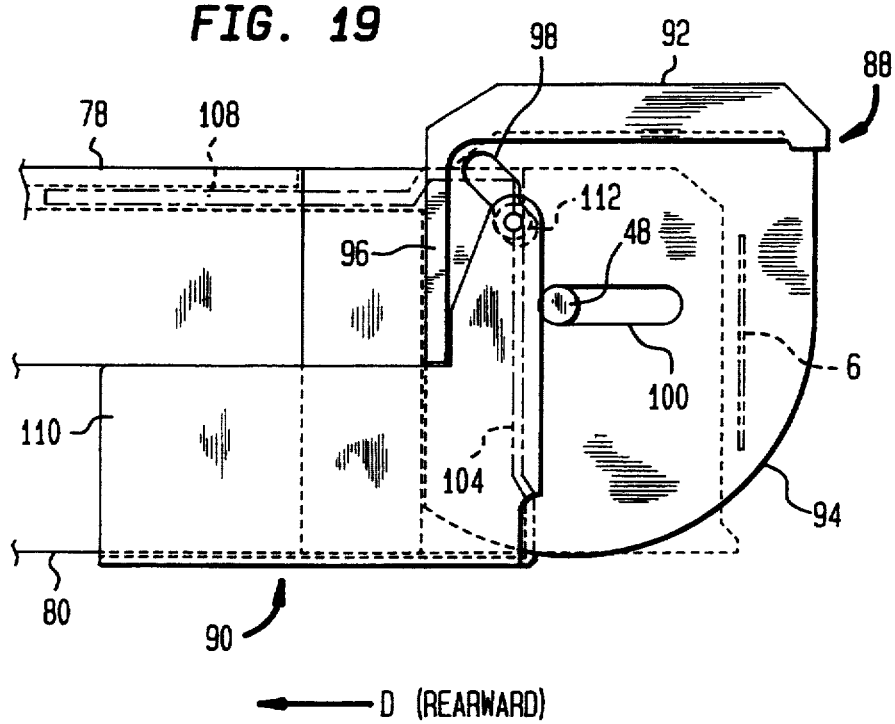
FIG. 19 is a side view illustrating one aspect of the operation of the cassette of FIG. 15.

As shown in FIG. 19, when the front cover 88 is rotated at 90° until its horizontal state is reached and the stretched tape 6 is exposed to the outside. At this stage, the shafts 112 are located in the bent portion of the first guide post 98. The second guide slot 100 is maintained horizontal, thereby enabling the guide post 48 to position in a rearward end portion of the second guide slot 100. The abutment 96 of the leg portion 94 is in a suspended position above the side portions 110 of the slider 90 as shown in FIG. 19.

Figure 21:
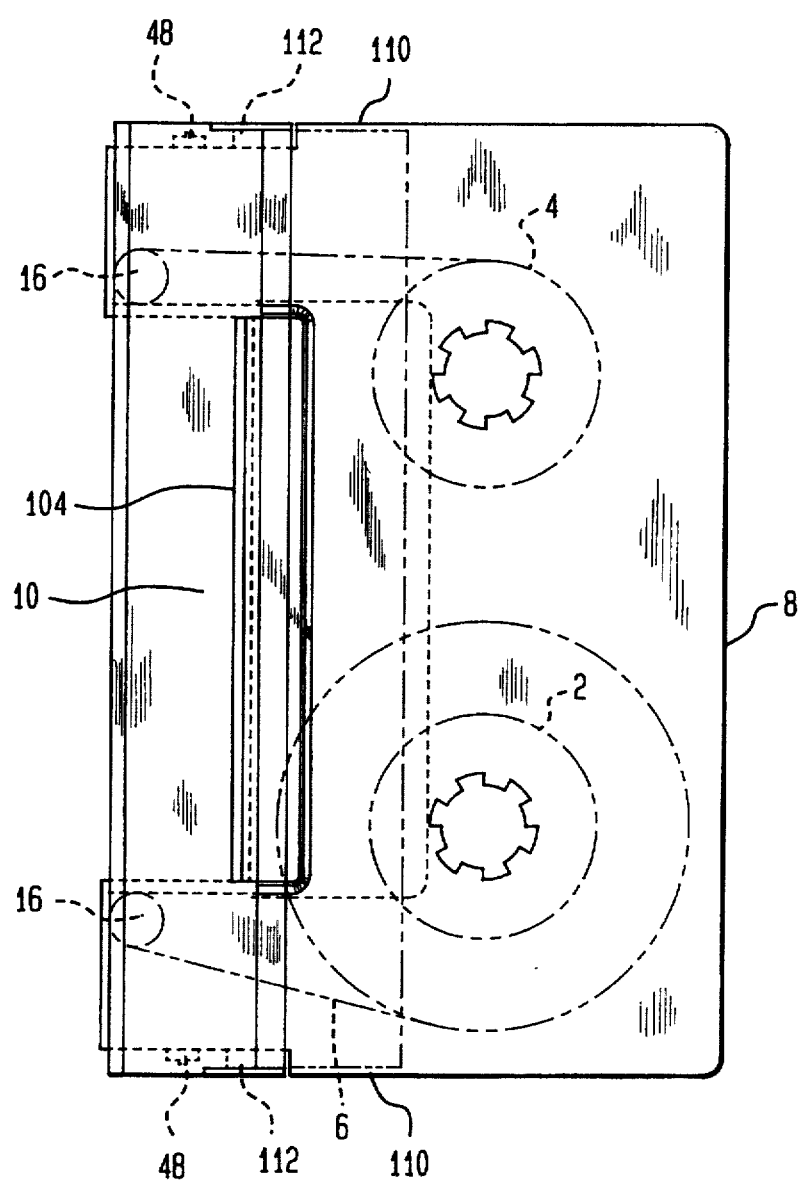
FIG. 21 is a plan view of the cassette in the state shown in FIG. 20.

At this stage, the front portion 104 of the slider 90 located in the opening 10 of the housing 8 is likely to prevent the guide post 48 from entering the opening 10. To avoid this, the slider 90 is further moved rearwardly, thereby enabling the shafts 112 to move rearwardly. The shafts 112 are restrained from vertical movement, and the guide post 48 of the housing 8 is located in the horizontally maintained second guide slot 100, thereby allowing the leg portions 94 to move rearwardly. The guide post 48 slides rearwardly in and along the second guide slot 100 in accordance with the rearward movement of the leg portions 94. As the leg portions 94 move rearwardly, the horizontally maintained front cover 88 slides rearwardly. As shown in FIGS. 20 and 21, the front portion 104 of the slider 90 comes to a point adjacent to a rearward end of the opening 10, and the abutments 96 of the leg portions 94 are brought into an upright position, and take a position between the upper portion 78 and the slider 90. Thus the abutments 96 are maintained in the upright position, and the leg portions 94 are maintained in the rotating position. At this stage, the front face 92 of the front cover 88 is also maintained in a horizontal position, and takes a position above the opening 10 of the housing 8. The front cover 88 is away from the stretched tape 6 so that a space is produced above the opening 10 to allow loading posts to enter and maneuver therein. It is possible to extend the second guide slot 100 forward so that the front cover 88 can be further slid rearwardly.

Alternatively, as shown in FIG. 21, when the leg portions 94 are rotated so that the front face 92 of the front cover 88 is horizontal maintained, it is possible to provide another guide slot 114 extending downwardly from a front end of the second guide slot 110 whereby the leg portions 94 are further rotated. In this case, the abutments 96 of the leg portions 94 end the steps 86 of the upper portion 78 are provided with slant portions 87 so that the leg portions 94 are smoothly rotated in a counter-clockwise direction about the guide post 112 as shown in FIG. 22. This modification is advantageous in that a larger space is formed above the opening 10 in the neighborhood of the tape 6.

Example 4

Figure 24:
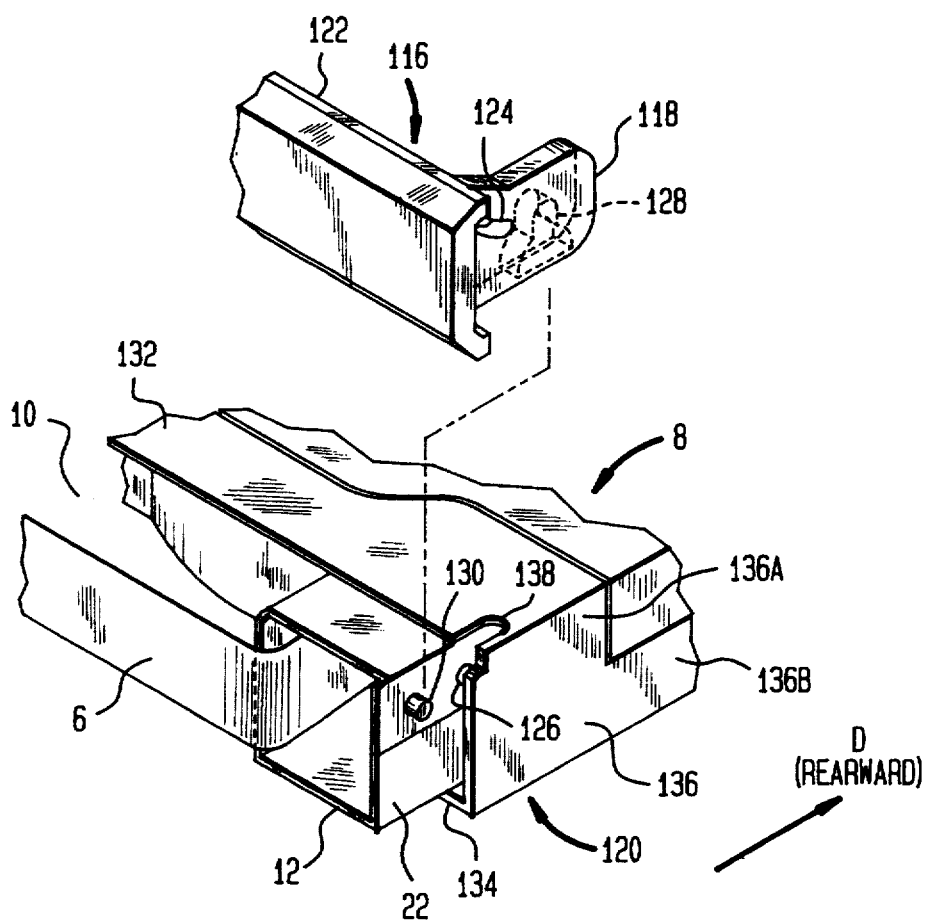
FIG. 24 is an exploded perspective view of the main part of the cassette of FIG. 23.
Figure 25:
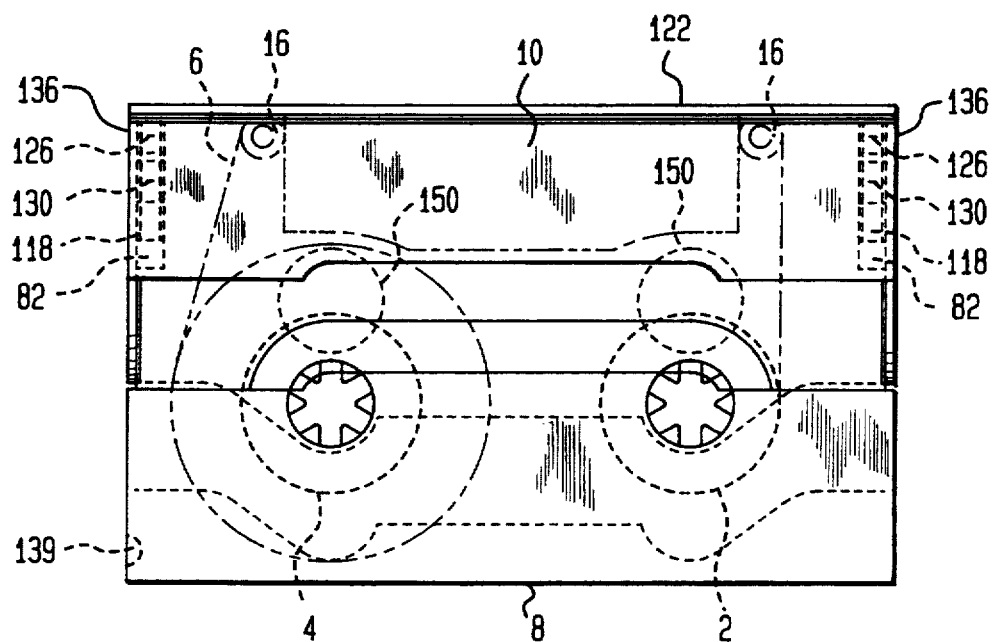
FIG. 25 is a plan view of the cassette of FIG. 23.

Referring to FIGS. 23 to 31, a fourth example will be described, wherein like numerals designate similar members in Examples 1, 2 and 3. Again only one side of the cassette will be described, and the other side will be omitted for simplicity:

This embodiment is different from Example 3 in the leg portions 118 of the front cover 116, the slider 120 and the configuration of the housing 8. As shown in FIG. 24, the leg portions 118 are made of a rectangular plate, and extend along the respective side portions of the housing 8. The leg portions 118 are located within the recesses 82 (FIG. 25) produced on the side walls of the upper portion 78 and the lower portion 80 of the housing 8, respectively. Each leg portion 118 is provided with a first guide slot 124 which is diagonally inclined and bent in the middle portion so as to reduce the angle of inclination. The guide slot 124 is designed to allow a shaft 126 of the slider 120 referred to below to slide therein.

In addition to the first guide slots 124, each leg portion 118 is provided with a second guide slot 128 which has a parallel part and a divergent part with a junction therebetween. The second guide slot 128 is designed to allow a guide post 130 formed on the outer surface 22 of the projecting part 12 to slide therein.

Figure 26:
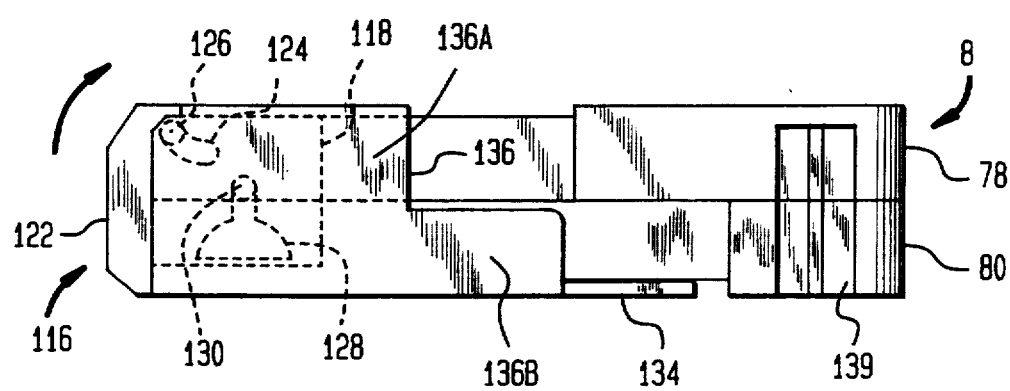
FIG. 26 is a side view of the cassette of FIG. 23.
Figure 27:
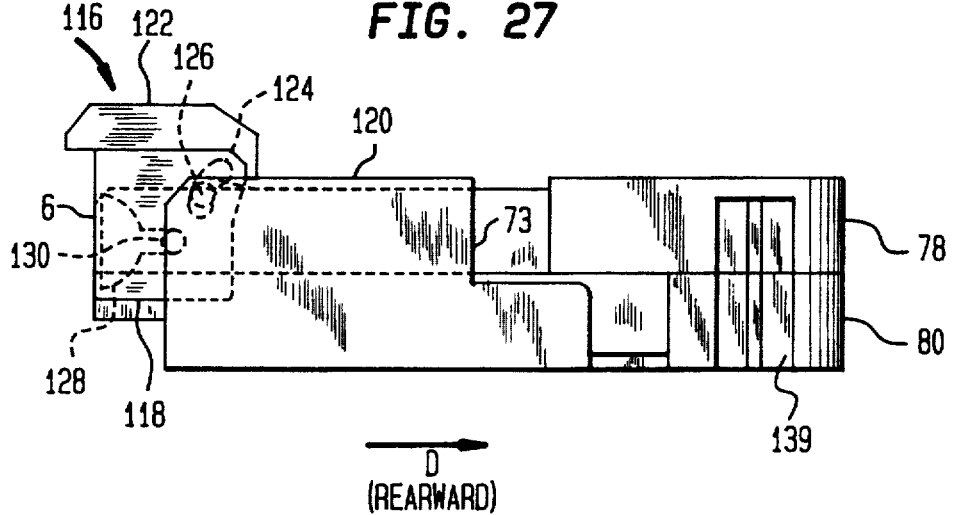
FIG. 27 is a side view illustrating one aspect of the operation of the cassette of FIG. 23.

The slider 120, box-shaped with an open front and an open back, includes a top portion 132, a bottom portion 134, and side portions 136. The top portion 132 covers the upper surface of the projecting parts 12 and the top portion of the opening 10 of the housing 8, and the bottom portion 132 covers the lower surface of the projecting parts 12 and the bottom portion of the opening 10 of the housing 10. The side portions 136 cover the outer side surfaces 22 of the projecting parts 12. As shown in FIG. 26, each side portion 136 of the slider 120 has an upper portion 136A extending along the width of the top portion 132, and a lower portion 136B extending in the direction of arrow D (rearward) beyond the upper portion 136A. The side 136 covers the recesses 82 and 84.

The slider 120 is slid in such a manner that the upper portions 136A of the side portions 136 slide along the upper portion 78 which is sufficiently recessed to allow the passage of the upper portions 136A and the lower portions 136B thereof slide along the lower portion 80 which is likewise recessed to allow the passage of the lower portions 136B. The bottom portion 134 has a semi-circular portion projecting beyond the side portions 136 so as to cover the first and second reels 2 and 4. The bottom portion 134 is provided with a pair of apertures 150 corresponding to the reels 2 and 4. The side portions 136 are provided with a shaft 125 extending inward, which is slidably carried in the first guide slot 124.

The top portion 132 of the slider 120 is provided with slits 138 (FIG. 24) which extend in the direction of arrow D so as to correspond to the leg portions 118. The slits 138 are open at the front ends thereof. The slider 120 is loaded in the direction of arrow A (forward) by a spring (not shown).

Figure 23:
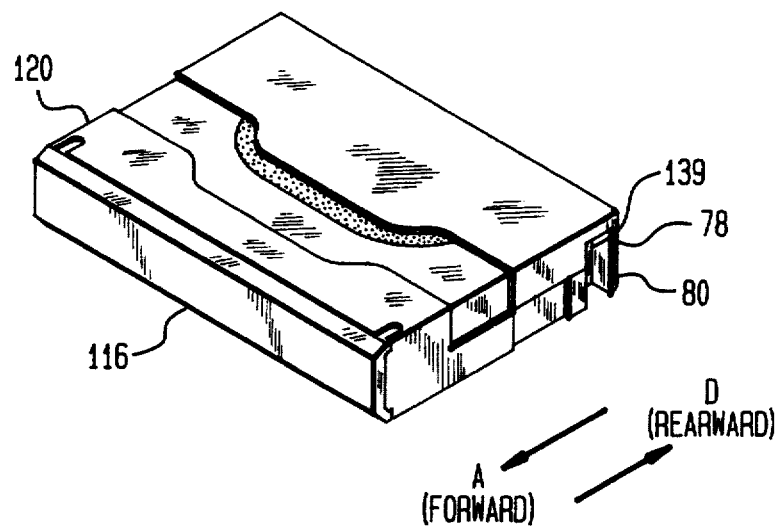
FIG. 23 is a perspective view of a fourth example of the cassette according to the invention.

In FIGS. 23 and 26, each side portion of the housing 8 is provided with a vertically formed slot 139 having a lower open end. The upper end thereof does not reach the top surface of the housing 8. These slots 139 receive suitable posts formed on the apparatus so that the cassette is prevented from being placed in the apparatus in an upside-down position.

The cassette is assembled in the following manner:

The reels 2 and 4 each having a tape 6 are placed in the upper portion 78 and the lower portion 80 of the housing 8 with the tape 6 stretched at the opening 10. Then the upper portion 78 and the lower portion 80 are Joined by means of screws. The slider 120 is forwardly loaded by the spring. The guide post 130 is fitted In the second guide slot 128 and the shaft 126 is fitted in the first guide slot 124. In this way, the housing 8 is covered by the front cover 110. There is no possibility of the slider 120 being inadvertently withdrawn from the housing 8 irrespective of the fact that the slider 120 is forwardly loaded. In this way the assembly of the cassette is finished.

Figure 28:
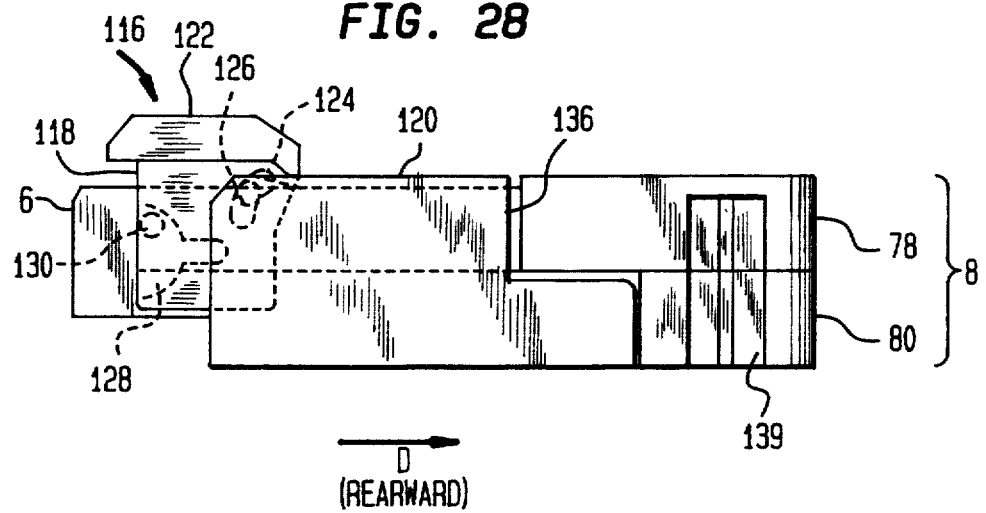
FIG. 28 is a side view illustrating the subsequent aspect of the operation of FIG. 27.
Figure 29:
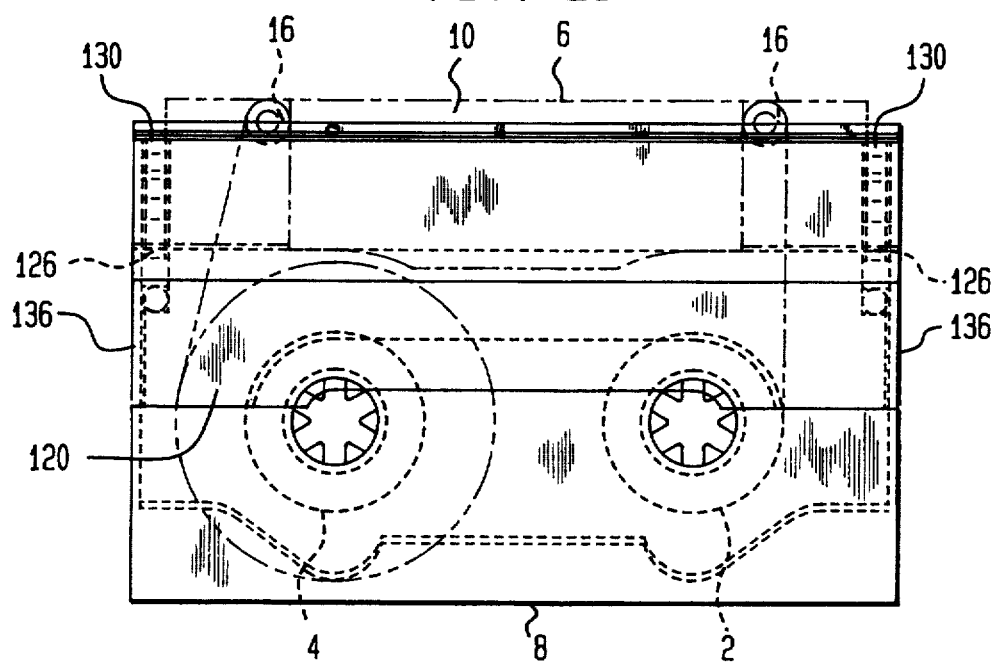
FIG. 29 is a plan view of the cassette in the state of FIG. 28.

In operation, when the cassette is placed on the apparatus, the slider 120 is pushed against the spring in the direction of arrow D (rearward). The slider 120 is likewise rearwardly moved, thereby enabling the shaft 126 to slide in and along the first guide slot 124. The leg portions 118 are caused to rotate upwardly around the guide post 130 while sliding diagonally downwardly. As shown in FIG. 26, when the shaft 12 slides in and along the first guide slot 124 and reaches the bent portion of the guide slot 124, the front cover 11G is rotated at 90° around the guide post 130, thereby enabling the front face 122 of the front cover 116 to take a horizontal position. In this way the magnetic side of the tape 6 is exposed to the outside. At this stage, the parallel part of the second guide post 128 becomes horizontal. When the slider 120 is further moved rearwardly against the spring, the shaft 126 of the slider 120 urges the leg portions 118 to rotate, thereby moving the guide post 130 to move rearwardly within the second guide slot 128. As shown in FIG. 28, the leg portions 118 are moved forwardly, thereby causing the guide post 130 to leave the parallel part of the second guide slot 128 and reach the Junction between the parallel part and the divergent part. At this stage, the shaft 126 takes a position at the bent portion in the first guide slot 124, and moves to the smaller gradient upper part of the first guide slot 124 in accordance with the rearward movement of the leg portions 118, thereby enabling the guide post 130 to move along the upper side of the divergent part of the second guide slot 128. In this way the leg portions 118 are moved downwardly. As the shaft 126 moves upwardly in and along the first guide slot 124, thereby enabling the leg portions 118 to move downwardly, and the horizontally maintained front portion 122 of the front cover 116 to move downwardly while moving forwardly. As shown in FIG. 28, the guide post 130 takes an upper position in the divergent part of the second guide slot 128. In this situation, the housing 8 is open at the bottom, free from the bottom portion 134 of the slider 120, and the apertures of the slider 120 are located coaxial with the reels 2 and 4. The front portion 122 of the front cover 116 allows a sufficient space for enabling the loading posts or tape catcher to maneuver. Then, the cassette is moved to a predetermined position, and the tape is brought to mount on a cylinder having a built-in rotary head or heads of the apparatus.

Figure 30:
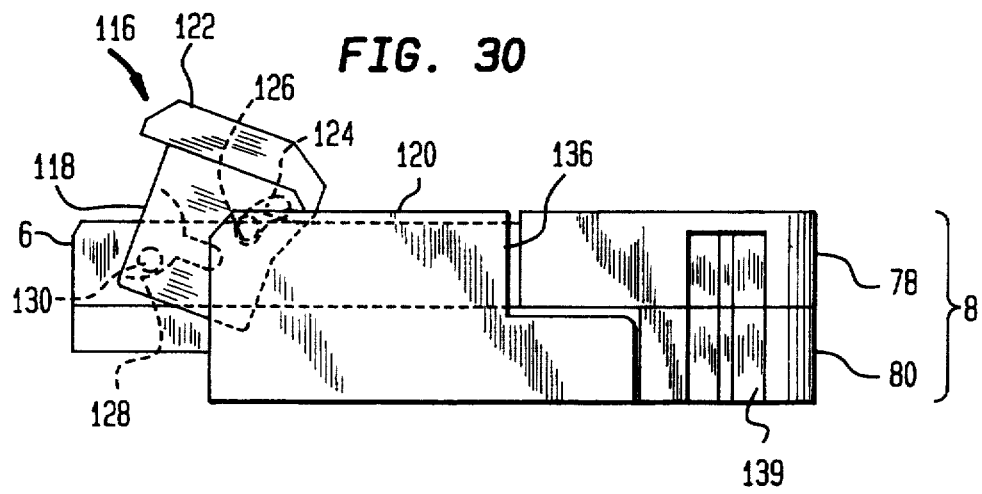
FIG. 30 is a side view illustrating another aspect of the operation of the cassette of FIG. 23.

In this situation, where required, the front portion 122 of the front cover 116 can be pushed upwardly. As shown in FIG. 30, the guide post 130 is moved within the divergent pert, and the shaft 126 of the slider 120 is moved downwardly from the bent portion of the first guide slot 124. Thus the front portion 122 is rotated upwardly, thereby enlarging the space above the opening 10 adjacent to the opening 10. If any obstruction is likely to occur against the maneuvering of the loading posts or tape catcher in the opening 10, it can be avoided by pushing the front portion 122 upwardly so that the tape catcher is positioned in the opening 10 with certainty.

Figure 31:
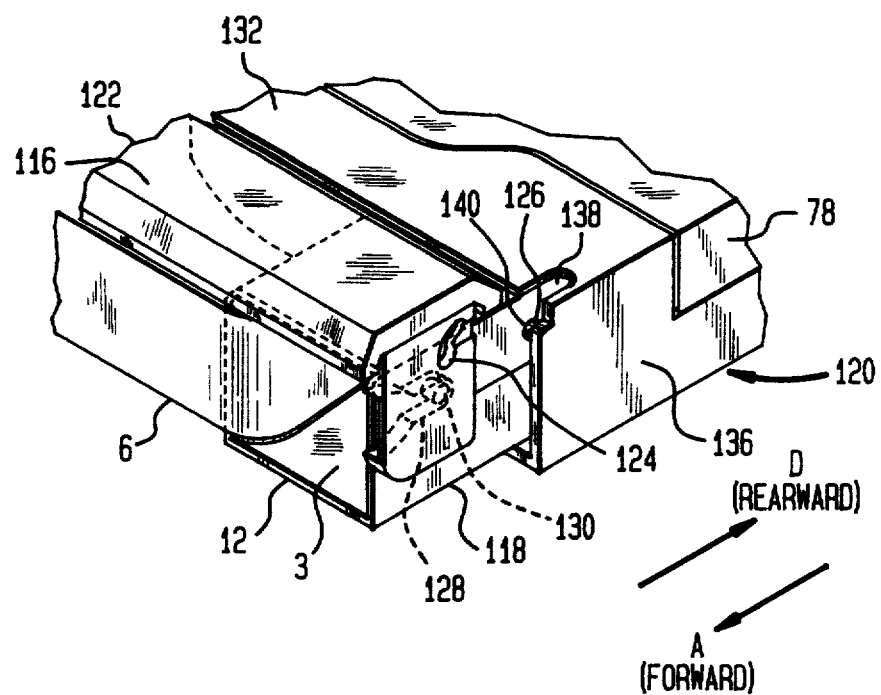
FIG. 31 is a perspective view of a main part of a modified version of the cassette of FIG. 23.
Figure 34:
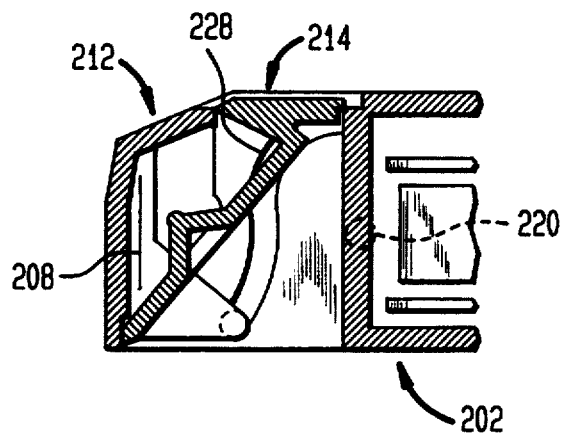
FIG. 34 is a cross-sectional view of a main part of the conventional cassette of FIG. 32.
Figure 35:
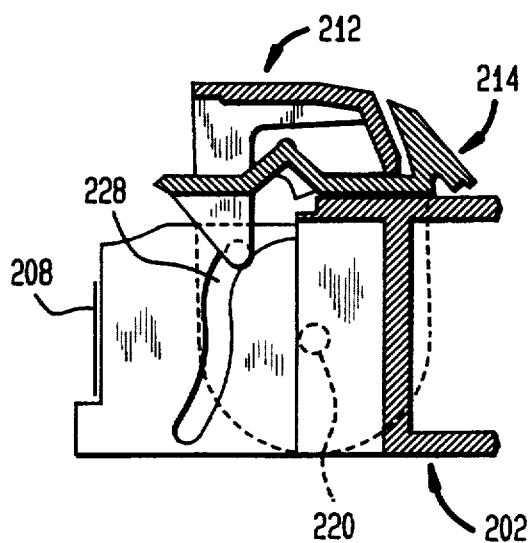
FIG. 35 is a cross-sectional view of the main part illustrating the operation of the cassette of FIG. 32.
Figure 32:
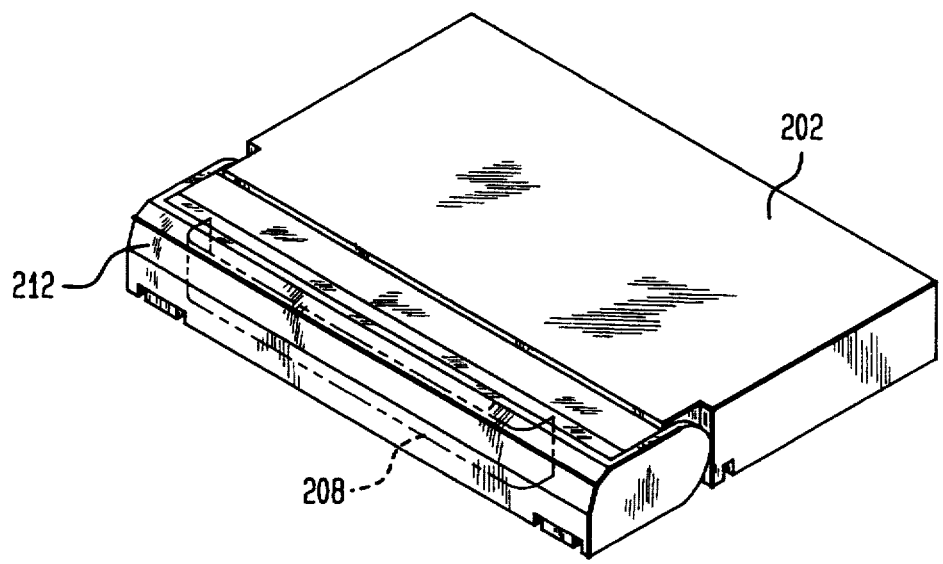
FIG. 32 is a perspective view showing a conventional cassette.
Figure 33:
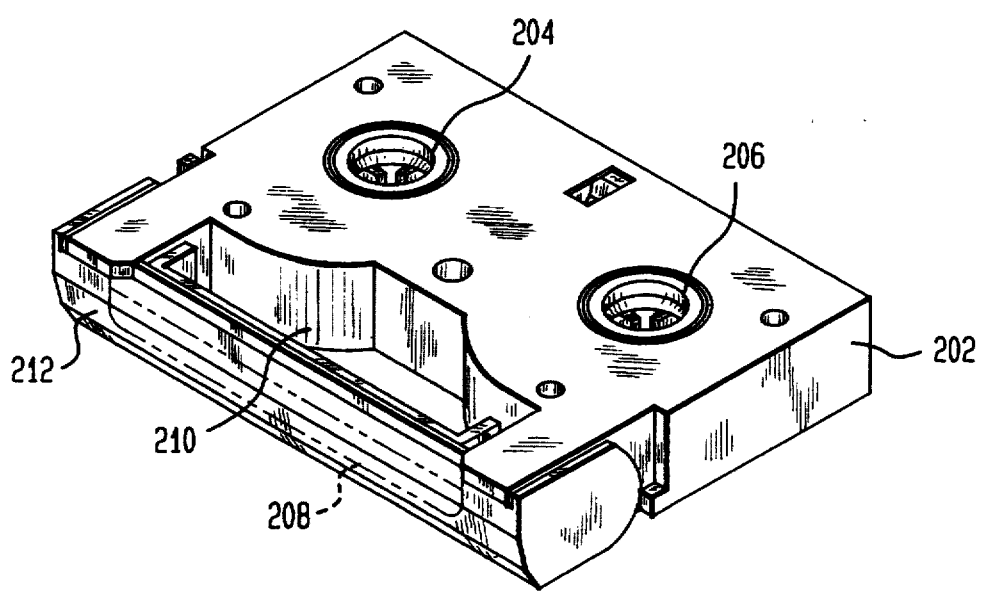
FIG. 33 is a perspective view showing the cassette of FIG. 32 turned upside down.
Figure 36:
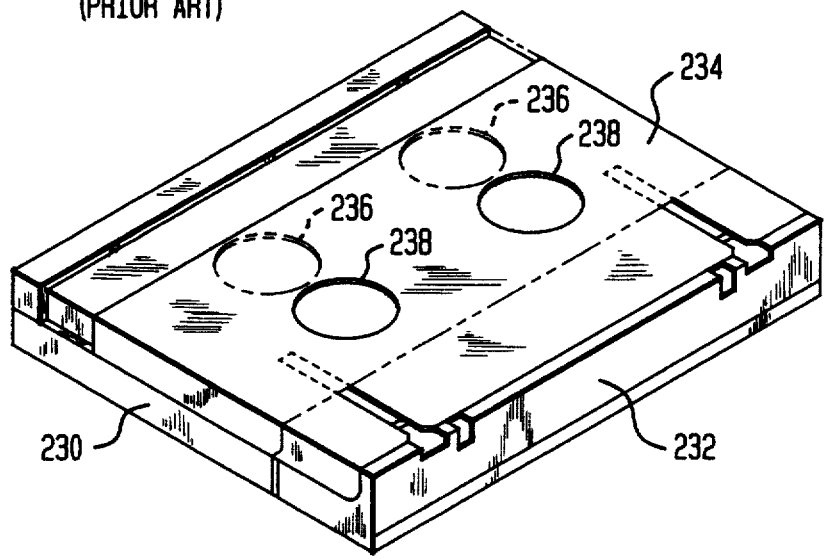
FIG. 36 is a perspective view showing another example of the conventional cassette turned upside down.
Figure 37:
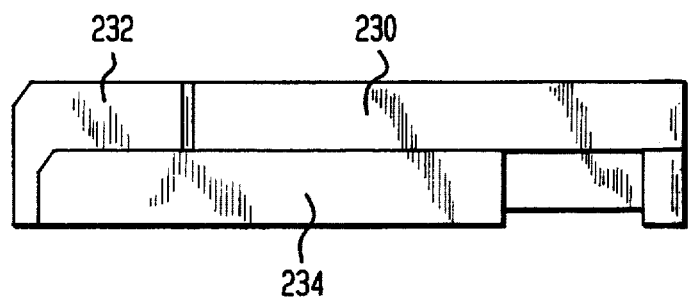
FIG. 37 is a side view of the cassette of FIG. 36.
Figure 38:
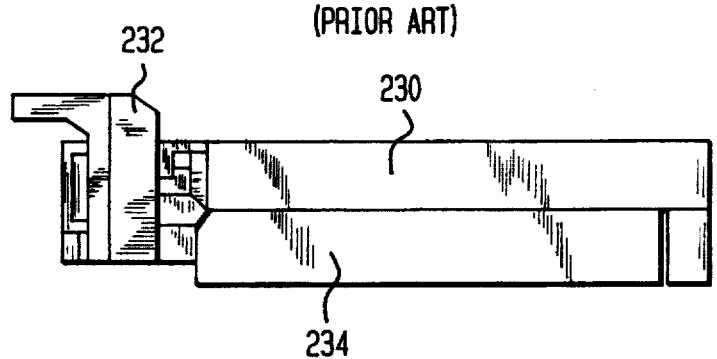
FIG. 38 is a side view illustrating the operation of the cassette of FIG. 36.
Figure 39:
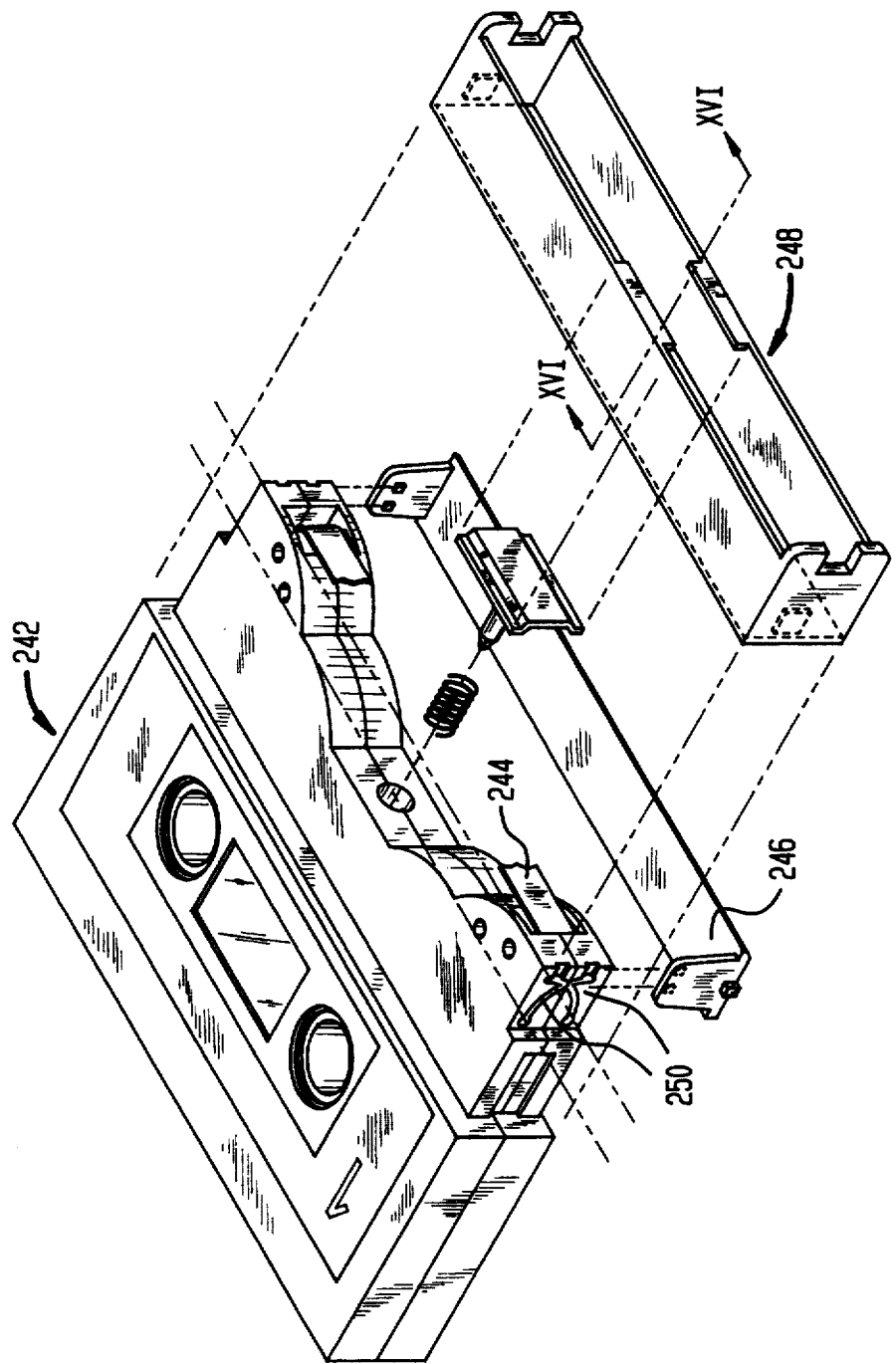
FIG. 39 is a partial exploded view illustrating another example of the conventional cassette.
Figure 40:
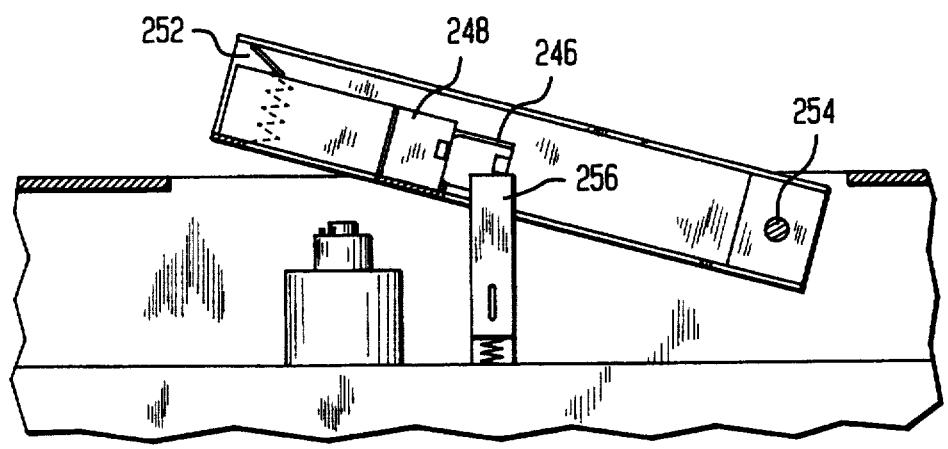
FIG. 40 is a schematic view showing a cassette holder containing a cassette in the example of FIG. 39.
Figure 41:
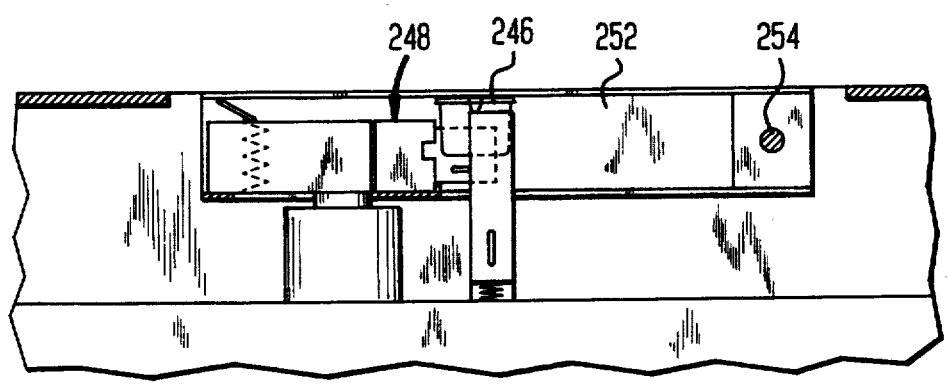
FIG. 41 is a schematic view showing the cassette holder of FIG. 40 in its operation position.

Referring to FIG. 31, an alternative embodiment will be described:

The shaft 126 is provided with an inclined surface 140 toward the side portion 136, and a groove 142 produced in the leg portions 118 so as to enable the top end of the inclined surface 140 of the shaft 126 to fit in when the leg portions 118 is rotated thereby causing the front portion 122 of the front cover 116 to take a horizontal position. Another groove 128 is formed in each leg portion 118 which is open in the surface of the leg portions 118 which is opposed to the side portion 136. The groove 128 extends rearwardly from the end of the leg portion 118. The groove 142 extends straight up to the upper end of the first guide slot 124.

This alternative construction facilitates the assemblage of the cassette. More specifically, when the shafts 126 is to fit An the first guide slot 124 after the guide post 130 comes into engagement with the second guide slot 128, the inclined surface 140 is kept in contact with the groove 142, and the leg portions 118 are moved rearwardly, the inclined surface 140 smoothly slides in and along the groove 142, and is guided into the guide slot 124. In this way a quick assemblage is possible.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains,

What is claimed is:

1. A tape cassette comprising:
   a housing having a front surface which has two side portions, said housing having a projection at each side portion on the front surface of said housing, said projection at each side portion forming an opening therebetween in which a plurality of loading posts are entered, and having tape running apertures;
   a pair of tape reels rotatably disposed in said housing;
   a magnetic tape disposed in said housing and carried on said tape reels and stretched through said tape running apertures of the projections by said loading posts in such a manner that said tape is exposed to the outside;
   a slider slidably mounted on said housing, said slider having a front portion located at said opening;
   a front cover supported by both said slider and housing, said front cover and said front portion of said slider covering said magnetic tape exposed to the outside at said opening, the front cover having a pair of leg portions which are positioned in the sides of the housing, at least a part of the leg portions being covered with the slider; and
   shifting means for rotating said front cover in the direction in which said loading posts are entered into said opening, and sliding said front cover in such a direction that said front cover moves away from said magnetic tape so that in accordance with a movement of said slider in a direction that said front portion moves away from said magnetic tape, said magnetic tape is exposed to the outside at said opening.

2. A tape cassette according to claim 1, further comprising a sliding means for sliding said front cover from a position at which said front cover is shifted by said shifting means in such a direction that said front cover moves away from said magnetic tape located at said opening.

3. A tape cassette according to claim 1, wherein said magnetic tape in said opening is closed at both sides by said front cover and said slider.

4. A tape cassette according to claim 1, further comprising means for loading said slider in the direction in which said slider is moved toward said front cover.

5. A tape cassette comprising
   a housing having a front surface which has two side portions, said housing having a projection at each side portion on the front surface of said housing, said projection at each side portion forming an opening therebetween in which a plurality of loading posts are entered, and having tape running apertures;
   a pair of tape reels rotatably disposed in said housing;
   a magnetic tape disposed in said housing and carried on said tape reels and stretched through said tape running apertures of the projections by said loading posts in such a manner that said tape is exposed to the outside;
   a slider slidably mounted on said housing;
   a front cover supported by both said slider and housing, said front cover covering said magnetic tape facing outward at said opening, the front cover having a pair of leg portions which are positioned in the sides of the housing, at least a part of the leg portions being covered with the slider;
   rotation means for rotating said front cover in the direction in which said loading posts are entered into said opening so that in accordance with a movement of said slider away from said magnetic tape, said magnetic tape is exposed to the outside at said opening; and
   sliding means for sliding said front cover in such a direction that said front cover moves away from said opening from a position that said front cover is rotated by said rotation means so that said front cover is positioned toward rotation in the direction in which said loading posts are entered into said opening.

6. A tape cassette comprising;
   a housing having a front surface which has two side portions, said housing having a projection at each side portion on the front surface of said housing, said projection at each side portion forming an opening therebetween in which a plurality of loading posts are entered, and having tape running apertures;
   a pair of tape reels rotatably disposed in said housing;
   a magnetic tape disposed in said housing and carried on said tape reels and stretched through said tape running apertures of the projections by said loading posts in such a manner that said tape is exposed to the outside;
   a slider slidably mounted on said housing;
   a front cover supported by both said slider and housing, and covering said magnetic tape facing outward at said opening, the front cover having a pair of leg portions which are positioned in the sides of the housing, at least a part of the leg portions being covered with the slider;
   rotation means for rotating said front cover in the direction in which said loading posts are entered into said opening so that in accordance with a movement of said slider away from said magnetic tape, said magnetic tape is exposed to the outside at said opening; and sliding means for sliding said front cover from a position that said front cover is rotated by said rotation means in such a direction that said front cover moves away from said magnetic tape in said opening so that said front cover is positioned toward rotation in the direction in which said loading posts are entered into said opening.

7. A tape cassette comprising:

a housing having a front surface which has two side portions, said housing having a projection at each side portion on the front surface of said housing, said projection at each side portion forming an opening therebetween in which a plurality of loading posts are entered, and having tape running apertures;

a pair of tape reels rotatably disposed in said housing;

a magnetic tape disposed in said housing and carried on said tape reels and stretched through said tape running apertures of the projections by said loading posts in such a manner that said tape is exposed to the outside;

a slider slidably mounted on said housing, said slider having a front portion located in said opening;

a front cover having a pair of leg portions supported by both said slider and housing in such a manner that said front cover and said front portion of said slider cover said magnetic tape exposed to the outside at said opening, the leg portions being integral with the front cover and being positioned in the sides of the housing, at least a part of the leg portions being covered with the slider; and shifting means for rotating said front cover in the direction in which said loading posts are entered into said opening, and sliding said front cover in such a direction that said front cover moves away from said magnetic tape so that in accordance with a movement of said slider in a direction that said front portion moves away from said magnetic tape, said magnetic tape is exposed to the outside at said opening.

8. A tape cassette according to claim 7, wherein said each leg portion is located between said housing and said slider.

9. A tape cassette according to claim 8, wherein said slider comprises faces for covering said opening of said housing, and slots for allowing said leg portions to fit in accordance with the rotation of said front cover.

10. A tape cassette according to claim 8, wherein said each leg portion comprises a first guide slot for fitting a shaft on the slider, and a second guide slot for enabling a guide post on an outer surface of each projection to slidably fit in said second guide slot, said second guide slot being brought into a perpendicular position to said first guide slot when said front cover covers said magnetic tape.

11. A tape cassette according to claim 10, wherein said guide slot of said each leg portion is diverged in such a manner that said front cover is further rotated in the direction in which said loading posts are entered into said opening.

12. A tape cassette according to claim 8, further comprising means for stopping said front cover from rotation when said slider remains motionless.

13. A tape cassette comprising:

a housing having a front surface which has two side portions, said housing having a projection at each side portion on the front surface thereof, said projection at each side portion forming an opening therebetween in which a plurality of loading posts are entered, and having tape running apertures;

a pair of tape reels rotatably disposed in said housing;

a magnetic tape disposed in said housing and carried on said tape reels and stretched through said tape running apertures of the projections by said loading posts in such a manner that said tape is exposed to the outside;

a slider slidably mounted on said housing, said slider having a front portion located in said opening;

a front cover having a pair of leg portions supported by both said slider and housing in such a manner that said front cover and said front portion of said slider cover said magnetic tape exposed to the outside at said opening, the pair of leg portions being integral with the front cover and are positioned in the sides of the housing, at least a part of the leg portions being covered with the slider; and rotation means for rotating said front cover in the direction in which said loading posts are entered into said opening, in accordance with a movement of said slider away from said magnetic tape so that said magnetic tape is exposed to the outside at said opening.

14. A tape cassette according to claim 13, further comprising a sliding means for sliding said front cover from a position at which said front cover is rotated by said rotation means in such a direction that said front cover moves away from said magnetic tape in said opening, and rotating said front cover in the direction in which said loading posts are entered into said opening.

15. A tape cassette according to claim 13, wherein said each leg portion is located between said housing and said slider.

16. A tape cassette according to claim 15, wherein said each leg portion is provided with a first guide slot for enabling a shaft on said slider to slidably fit in said first guide slot, and a second guide slot for enabling a guide post of said housing to loosely fit in said second guide slot, wherein said front cover is rotated by engagement between said shaft and said guide slot, and said guide post and said second guide slot.

* * * * *

UNITED STATES PATENT AND TRADEMARK OFFICE
CERTIFICATE OF CORRECTION

PATENT NO. : 5,363,268
DATED : November 8, 1994
INVENTOR(S) : Utsumi et al.

It is certified that error appears in the above-identified patent and that said Letters Patent is hereby corrected as shown below:

COVER PAGE, right column, first line, change "0160622" to --0160822--.

COVER PAGE [57] Abstract, line 10, the word "end" should be --and--.

Column 17, lines 54-55, change "the sides" to --recesses in the side portions--.

column 18, line 29, change "the sides" to --recesses in the side portions--.

Column 18, line 62, change "the sides" to --recesses in the side portions--.

Column 19, line 34, change "the sides" to --recesses in the side portions--.

UNITED STATES PATENT AND TRADEMARK OFFICE
CERTIFICATE OF CORRECTION

PATENT NO. : 5,363,268
DATED : November 8, 1994
INVENTOR(S) : Utsumi, et al

It is certified that error appears in the above-indentified patent and that said Letters Patent is hereby corrected as shown below:

Column 20, line 32, change "the sides" to --recesses in the side portions--.

Signed and Sealed this

Fourteenth Day of March, 1995

Attest:

BRUCE LEHMAN

Attesting Officer

Commissioner of Patents and Trademarks